United States Patent
Loheide et al.

(10) Patent No.: US 10,958,952 B2
(45) Date of Patent: Mar. 23, 2021

(54) PUBLISHING A PLURALITY OF DISPARATE LIVE MEDIA OUTPUT STREAM MANIFESTS USING LIVE INPUT STREAMS AND PRE-ENCODED MEDIA ASSETS

(71) Applicant: Turner Broadcasting Systems, Inc., Atlanta, GA (US)

(72) Inventors: Donald Jude Loheide, Mableton, GA (US); Nishith Kumar Sinha, Mableton, GA (US); Nicolas Paul Webb, McDonough, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 0 days.

(21) Appl. No.: 16/235,445

(22) Filed: Dec. 28, 2018

(65) Prior Publication Data

US 2019/0141377 A1    May 9, 2019

Related U.S. Application Data

(63) Continuation-in-part of application No. 15/396,475, filed on Dec. 31, 2016.

(51) Int. Cl.
*H04N 21/24* (2011.01)
*H04N 21/218* (2011.01)
(Continued)

(52) U.S. Cl.
CPC ......... *H04N 21/2407* (2013.01); *G06F 21/10* (2013.01); *H04L 65/4076* (2013.01);
(Continued)

(58) Field of Classification Search
CPC .. G06F 21/10; H04N 21/258; H04N 21/2181; H04N 21/2668; H04N 21/6125;
(Continued)

(56) References Cited

U.S. PATENT DOCUMENTS

| 3,751,581 A | 8/1973 | Sakata et al. |
| 4,500,930 A | 2/1985 | Hamalainen et al. |

(Continued)

OTHER PUBLICATIONS

Advisory Action for U.S. Appl. No. 15/396,475 dated Jun. 3, 2019.
(Continued)

*Primary Examiner* — Chenea Davis
(74) *Attorney, Agent, or Firm* — Chip Law Group

(57) ABSTRACT

A media packaging and distribution system that issues a plurality of first instructions into an instruction queue, allocates each of the plurality of first instructions to a corresponding first worker based on instruction type and priority level, determines a first and second manifest metadata based on validation and parsing of a first and second manifest data read from locations of corresponding input manifests, and ingests the determined first manifest metadata of a plurality of live input streams and a second manifest metadata of a plurality of pre-encoded media assets with corresponding indices in manifest metadata storage system. Further, a plurality of second instructions are issued to the instruction queue, allocate a second instruction from the plurality of second instructions to a second worker, and generate the plurality of disparate live media output stream manifests for a plurality of channels to be viewed on a plurality of consumer devices.

38 Claims, 6 Drawing Sheets

(51) Int. Cl.
  *G06F 21/10* (2013.01)
  *H04L 29/06* (2006.01)
  *H04N 21/258* (2011.01)
  *H04N 21/61* (2011.01)
  *H04N 21/2668* (2011.01)
  *H04N 21/2187* (2011.01)
  *H04N 21/262* (2011.01)

(52) U.S. Cl.
  CPC ........ *H04L 65/4084* (2013.01); *H04L 65/601* (2013.01); *H04L 65/602* (2013.01); *H04L 65/607* (2013.01); *H04L 65/608* (2013.01); *H04L 65/80* (2013.01); *H04N 21/2181* (2013.01); *H04N 21/2187* (2013.01); *H04N 21/258* (2013.01); *H04N 21/2668* (2013.01); *H04N 21/26258* (2013.01); *H04N 21/6125* (2013.01)

(58) Field of Classification Search
  CPC ........... H04N 21/2187; H04N 21/2407; H04N 21/26258; H04L 65/602; H04L 65/601; H04L 65/4076; H04L 65/608; H04L 65/607; H04L 65/80; H04L 65/4084
  See application file for complete search history.

(56) References Cited

U.S. PATENT DOCUMENTS

| | | |
|---|---|---|
| 5,294,981 A | 3/1994 | Yazolino et al. |
| 6,229,524 B1 | 5/2001 | Chernock et al. |
| 6,378,129 B1 | 4/2002 | Zetts |
| 6,434,621 B1 | 8/2002 | Pezzillo et al. |
| 6,625,811 B1 | 9/2003 | Kaneko |
| 6,701,355 B1 | 3/2004 | Brandt et al. |
| 6,727,914 B1 | 4/2004 | Gutta |
| 7,051,352 B1 | 5/2006 | Schaffer |
| 7,337,458 B2 | 2/2008 | Michelitsch et al. |
| 7,380,262 B2 | 5/2008 | Wang et al. |
| 7,581,237 B1 | 8/2009 | Kurapati |
| 7,840,980 B2 | 11/2010 | Gutta |
| 7,985,134 B2 | 7/2011 | Ellis |
| 8,005,826 B1 | 8/2011 | Sahami et al. |
| 8,099,757 B2 | 1/2012 | Riedl et al. |
| 8,132,203 B2 | 3/2012 | Heer |
| 8,533,761 B2 | 9/2013 | Sahami et al. |
| 8,572,649 B1 | 10/2013 | Gossweiler et al. |
| 8,578,042 B2 | 11/2013 | Hu et al. |
| 8,631,440 B2 | 1/2014 | Gossweiler et al. |
| 8,826,443 B1 | 9/2014 | Raman et al. |
| 8,842,879 B2 | 9/2014 | Laksono et al. |
| 8,843,965 B1 | 9/2014 | Kurapati et al. |
| 8,954,521 B1 | 2/2015 | Faaborg et al. |
| 9,094,639 B2 | 7/2015 | Yim et al. |
| 9,130,918 B2 | 9/2015 | Picconi et al. |
| 9,342,668 B2 | 5/2016 | Wang et al. |
| 9,380,264 B1 | 6/2016 | Vakalapudi |
| 9,390,447 B1 | 7/2016 | Smith |
| 10,075,753 B2 | 9/2018 | Loheide et al. |
| 2002/0038457 A1 | 3/2002 | Numata et al. |
| 2002/0178447 A1 | 11/2002 | Plotnick et al. |
| 2003/0023757 A1 | 1/2003 | Ishioka et al. |
| 2003/0026628 A1 | 2/2003 | Arimoto |
| 2003/0051239 A1 | 3/2003 | Hudspeth |
| 2003/0110507 A1 | 6/2003 | Dimitrova et al. |
| 2003/0126600 A1 | 7/2003 | Heuvelman |
| 2003/0151538 A1 | 8/2003 | Escobosa et al. |
| 2003/0182658 A1 | 9/2003 | Alexander |
| 2003/0212708 A1 | 11/2003 | Potrebic et al. |
| 2003/0236832 A1 | 12/2003 | McIntyre et al. |
| 2004/0022278 A1 | 2/2004 | Thomas et al. |
| 2004/0031056 A1 | 2/2004 | Wolff |
| 2004/0128682 A1 | 7/2004 | Liga et al. |
| 2004/0163103 A1 | 8/2004 | Swix et al. |
| 2004/0172650 A1 | 9/2004 | Hawkins et al. |
| 2005/0015816 A1 | 1/2005 | Christofalo et al. |
| 2005/0060745 A1 | 3/2005 | Riedl et al. |
| 2005/0096978 A1 | 5/2005 | Black |
| 2005/0120369 A1 | 6/2005 | Matz |
| 2005/0132401 A1 | 6/2005 | Boccon-Gibod et al. |
| 2005/0135613 A1 | 6/2005 | Brandenburg et al. |
| 2006/0031889 A1 | 2/2006 | Bennett et al. |
| 2006/0064730 A1 | 3/2006 | Rael et al. |
| 2006/0122916 A1 | 6/2006 | Kassan |
| 2006/0287915 A1 | 12/2006 | Boulet et al. |
| 2007/0011718 A1 | 1/2007 | Nee |
| 2007/0033419 A1 | 2/2007 | Kocher et al. |
| 2007/0186228 A1 | 8/2007 | Ramaswamy et al. |
| 2007/0238035 A1 | 10/2007 | Holscher et al. |
| 2007/0250901 A1 | 10/2007 | McIntire et al. |
| 2008/0086742 A1 | 4/2008 | Aldrey et al. |
| 2008/0201735 A1 | 8/2008 | Sumiyoshi et al. |
| 2008/0271078 A1 | 10/2008 | Gossweiler et al. |
| 2008/0271080 A1 | 10/2008 | Gossweiler et al. |
| 2008/0320513 A1 | 12/2008 | Wong et al. |
| 2009/0070808 A1 | 3/2009 | Jacobs |
| 2009/0070819 A1 | 3/2009 | Gajda et al. |
| 2009/0100452 A1 | 4/2009 | Hudgeons et al. |
| 2009/0254934 A1 | 10/2009 | Grammens |
| 2009/0256972 A1 | 10/2009 | Ramaswamy et al. |
| 2009/0285217 A1 | 11/2009 | Frink et al. |
| 2009/0287790 A1 | 11/2009 | Upton et al. |
| 2010/0010899 A1 | 1/2010 | Lambert et al. |
| 2010/0125880 A1 | 5/2010 | Roewe |
| 2010/0146548 A1 | 6/2010 | Yim et al. |
| 2010/0146559 A1 | 6/2010 | Lee et al. |
| 2010/0169914 A1 | 7/2010 | Williamson et al. |
| 2010/0287297 A1 | 11/2010 | Lefebvre |
| 2010/0325655 A1 | 12/2010 | Perez |
| 2010/0325657 A1 | 12/2010 | Sellers et al. |
| 2011/0022471 A1 | 1/2011 | Brueck et al. |
| 2011/0052144 A1 | 3/2011 | Abbas et al. |
| 2011/0123062 A1 | 5/2011 | Hilu |
| 2011/0153464 A1 | 6/2011 | Hendricks et al. |
| 2011/0161500 A1 | 6/2011 | Yengalasetti et al. |
| 2011/0164115 A1 | 7/2011 | Bennett et al. |
| 2011/0177775 A1 | 7/2011 | Gupta et al. |
| 2011/0209181 A1 | 8/2011 | Gupta et al. |
| 2011/0238754 A1 | 9/2011 | Dasilva et al. |
| 2011/0246202 A1 | 10/2011 | McMillan et al. |
| 2012/0017282 A1 | 1/2012 | Kang et al. |
| 2012/0110621 A1 | 5/2012 | Gossweiler |
| 2012/0143693 A1 | 6/2012 | Chung et al. |
| 2012/0192232 A1 | 7/2012 | Ellis |
| 2012/0271942 A1 | 10/2012 | Walker et al. |
| 2012/0272264 A1 | 10/2012 | Suzuki et al. |
| 2012/0284737 A1 | 11/2012 | Savoor et al. |
| 2012/0304223 A1 | 11/2012 | Sargent et al. |
| 2013/0121487 A1 | 5/2013 | Lorberbaum et al. |
| 2013/0160051 A1 | 6/2013 | Armstrong et al. |
| 2013/0198328 A1 | 8/2013 | Green et al. |
| 2013/0205212 A1 | 8/2013 | Sinha et al. |
| 2013/0208811 A1 | 8/2013 | Liu et al. |
| 2013/0227283 A1 | 8/2013 | Williamson et al. |
| 2013/0227284 A1 | 8/2013 | Pfeffer et al. |
| 2013/0263168 A1 | 10/2013 | Choi |
| 2013/0263182 A1 | 10/2013 | Ivy et al. |
| 2013/0276023 A1 | 10/2013 | Kent et al. |
| 2013/0305287 A1 | 11/2013 | Wong et al. |
| 2013/0312041 A1 | 11/2013 | Gresta |
| 2013/0325605 A1 | 12/2013 | Callaghan et al. |
| 2014/0013354 A1 | 1/2014 | Johnson et al. |
| 2014/0020017 A1 | 1/2014 | Stern et al. |
| 2014/0032259 A1 | 1/2014 | LaFever et al. |
| 2014/0033240 A1 | 1/2014 | Card |
| 2014/0071818 A1 | 3/2014 | Wang et al. |
| 2014/0143806 A1 | 5/2014 | Steinberg et al. |
| 2014/0150019 A1 | 5/2014 | Ma et al. |
| 2014/0152894 A1 | 6/2014 | Childs et al. |
| 2014/0157312 A1 | 6/2014 | Williams et al. |
| 2014/0173666 A1 | 6/2014 | Gordon et al. |
| 2014/0189514 A1 | 7/2014 | Hilliard |
| 2014/0189743 A1 | 7/2014 | Kennedy et al. |
| 2014/0189754 A1 | 7/2014 | Major et al. |

(56) References Cited

U.S. PATENT DOCUMENTS

| | | | |
|---|---|---|---|
| 2014/0237243 | A1 | 8/2014 | Ma et al. |
| 2014/0282723 | A1 | 9/2014 | Sinha et al. |
| 2014/0310745 | A1 | 10/2014 | Canney et al. |
| 2014/0317666 | A1 | 10/2014 | Chiarulli et al. |
| 2014/0351843 | A1 | 11/2014 | Theriault |
| 2014/0359656 | A1 | 12/2014 | Banica et al. |
| 2014/0366068 | A1 | 12/2014 | Burkitt et al. |
| 2015/0012926 | A1 | 1/2015 | Wei et al. |
| 2015/0033255 | A1 | 1/2015 | Neumann et al. |
| 2015/0058874 | A1 | 2/2015 | Sun et al. |
| 2015/0074732 | A1* | 3/2015 | Green ............... H04N 21/812 725/93 |
| 2015/0106856 | A1 | 4/2015 | Rankine |
| 2015/0127845 | A1 | 5/2015 | Phillips et al. |
| 2015/0237386 | A1 | 8/2015 | Sheehan et al. |
| 2015/0237389 | A1 | 8/2015 | Grouf et al. |
| 2015/0249865 | A1 | 9/2015 | Oliveira |
| 2015/0271234 | A1 | 9/2015 | O'Malley et al. |
| 2015/0289022 | A1 | 10/2015 | Gross |
| 2015/0382042 | A1 | 12/2015 | Wagenaar et al. |
| 2015/0382047 | A1 | 12/2015 | Os et al. |
| 2015/0382274 | A1 | 12/2015 | Logvinov et al. |
| 2016/0029055 | A1 | 1/2016 | Nunez et al. |
| 2016/0063530 | A1 | 3/2016 | Lin |
| 2016/0073155 | A1 | 3/2016 | Subramaniam et al. |
| 2016/0112740 | A1 | 4/2016 | Francisco et al. |
| 2016/0127786 | A1 | 5/2016 | Langer |
| 2016/0127788 | A1 | 5/2016 | Roberts et al. |
| 2016/0182954 | A1 | 6/2016 | Nguyen et al. |
| 2016/0198202 | A1 | 7/2016 | Brandenburg et al. |
| 2016/0227260 | A1 | 8/2016 | Hundemer et al. |
| 2016/0255391 | A1 | 9/2016 | Noble |
| 2016/0308958 | A1 | 10/2016 | Navali et al. |
| 2016/0316247 | A1* | 10/2016 | Biagini ............... H04N 21/4508 |
| 2017/0064400 | A1 | 3/2017 | Riegel et al. |
| 2017/0070789 | A1 | 3/2017 | Liassides et al. |
| 2017/0085935 | A1 | 3/2017 | Riedel et al. |
| 2017/0099506 | A1 | 4/2017 | Grover |
| 2017/0099525 | A1 | 4/2017 | Ray et al. |
| 2017/0171610 | A1 | 6/2017 | Nair et al. |
| 2017/0193544 | A1 | 7/2017 | Glasgow et al. |
| 2017/0195718 | A1 | 7/2017 | Nair et al. |
| 2017/0201779 | A1 | 7/2017 | Publicover et al. |
| 2017/0238035 | A1 | 8/2017 | Perez |
| 2017/0289597 | A1* | 10/2017 | Riedel ............... H04N 21/2183 |
| 2018/0007060 | A1 | 1/2018 | Leblang et al. |
| 2018/0048599 | A1 | 2/2018 | Arghandiwal et al. |
| 2018/0131986 | A1 | 5/2018 | Cole et al. |
| 2018/0165650 | A1 | 6/2018 | Kashyape et al. |
| 2018/0184047 | A1 | 6/2018 | Simonsen et al. |
| 2018/0300751 | A1 | 10/2018 | Hammitt et al. |
| 2018/0343505 | A1 | 11/2018 | Loheide et al. |
| 2020/0244778 | A1 | 7/2020 | Berookhim et al. |

OTHER PUBLICATIONS

Advisory Action for U.S. Appl. No. 15/988,308 dated Jul. 16, 2019.
Advisory Action for U.S. Appl. No. 15/986,218 dated Jul. 12, 2019.
Corrected Notice of Allowance for U.S. Appl. No. 15/396,453 dated Jun. 3, 2019.
Corrected Notice of Allowance in U.S. Appl. No. 15/396,453 dated Jun. 13, 2019.
Final Office Action for U.S. Appl. No. 15/986,218 dated Apr. 24, 2019.
Final Office Action for U.S. Appl. No. 15/988,308 dated May 9, 2019.
Final Office Action in U.S. Appl. No. 15/986,218 dated Apr. 24, 2019.
Non-Final Office Action for U.S. Appl. No. 15/986,361 dated Jul. 11, 2019.
Non-Final Office Action for U.S. Appl. No. 15/986,451 dated Jun. 27, 2019.
Non-final Office Action for U.S. Appl. No. 15/988,241 dated Jun. 27, 2019.
Notice of Allowance for U.S. Appl. No. 15/396,624 dated May 31, 2019.
Advisory Action in U.S. Appl. No. 15/396,453 dated Apr. 20, 2018.
Advisory Action in U.S. Appl. No. 15/396,468 dated Jan. 7, 2019.
Advisory Action in U.S. Appl. No. 15/396,475 dated Sep. 20, 2018.
Advisory Action in U.S. Appl. No. 15/396,614 dated Mar. 16, 2018.
Corrected Notice of Allowance in U.S. Appl. No. 15/396,462 dated Aug. 8, 2018.
Corrected Notice of Allowance in U.S. Appl. No. 15/396,462 dated Jul. 11, 2018.
Final Office Action in U.S. Appl. No. 15/396,468 dated Nov. 15, 2018.
Final Office Action in U.S. Appl. No. 15/396,475 dated Feb. 25, 2019.
Final Office Action in U.S. Appl. No. 15/396,475 dated Jul. 12, 2018.
Final Office Action in U.S. Appl. No. 15/396,614 dated Oct. 25, 2018.
Final Office Action in U.S. Appl. No. 15/396,624 dated Jan. 24, 2019.
Non-Final Office Action in U.S. Appl. No. 15/396,453 dated Jun. 14, 2018.
Non-Final Office Action in U.S. Appl. No. 15/396,468 dated Jul. 3, 2018.
Non-Final Office Action in U.S. Appl. No. 15/396,468 dated Mar. 1, 2019.
Non-Final Office Action in U.S. Appl. No. 15/396,475 dated Nov. 30, 2018.
Non-Final Office Action in U.S. Appl. No. 15/396,614 dated Mar. 7, 2019.
Non-Final Office Action in U.S. Appl. No. 15/396,614 dated May 18, 2018.
Non-Final Office Action in U.S. Appl. No. 15/396,624 dated Jul. 13, 2018.
Non-Final Office Action in U.S. Appl. No. 15/986,218 dated Nov. 28, 2018.
Notice of Allowance in U.S. Appl. No. 15/396,453 dated Jan. 10, 2019.
Notice of Allowance in U.S. Appl. No. 15/396,462 dated Jun. 1, 2018.
Notice of Allowance in U.S. Appl. No. 15/396,462 dated May 15, 2018.
Office Action in U.S. Appl. No. 15/396,468 dated Jan. 26, 2018.
Office Action in U.S. Appl. No. 15/396,453 dated Feb. 27, 2018.
Office Action in U.S. Appl. No. 15/396,475 dated Mar. 29, 2018.
Advisory Action for U.S. Appl. No. 15/396,468 dated Jan. 16, 2020.
Advisory Action for U.S. Appl. No. 15/986,361 dated Feb. 26, 2020.
Advisory Action for U.S. Appl. No. 15/986,451 dated Feb. 20, 2020.
Final Office Action for U.S. Appl. No. 15/396,475 dated Feb. 4, 2020.
Final Office Action for U.S. Appl. No. 15/986,218 dated Jan. 31, 2020.
Final Office Action for U.S. Appl. No. 15/986,361 dated Dec. 23, 2019.
Final Office Action for U.S. Appl. No. 15/986,451 dated Dec. 16, 2019.
Final Office Action for U.S. Appl. No. 15/988,241 dated Jan. 8, 2020.
Non-Final Office Action for U.S. Appl. No. 15/396,468 dated Feb. 4, 2020.
Non-Final Office Action for U.S. Appl. No. 15/986,406 dated Dec. 18, 2019.
Non-Final Office Action for U.S. Appl. No. 15/986,286 dated Nov. 29, 2019.
Non-Final Office Action for U.S. Appl. No. 15/988,308 dated Dec. 3, 2019.
Non-Final Office Action for U.S. Appl. No. 15/988,472 dated Dec. 27, 2019.
Non-Final Office Action for U.S. Appl. No. 15/988,492 dated Feb. 18, 2020.
Non-Final Office Action for U.S. Appl. No. 16/229,310 dated Nov. 29, 2019.

(56) References Cited

OTHER PUBLICATIONS

Non-Final Office Action for U.S. Appl. No. 16/229,497 dated Dec. 12, 2019.
Non-Final Office Action for U.S. Appl. No. 16/230,268 dated Jan. 8, 2020.
Non-Final Office Action for U.S. Appl. No. 16/234,870 dated Jan. 9, 2020.
Non-Final Office Action for U.S. Appl. No. 16/236,673 dated Jan. 10, 2020.
Notice of Allowance for U.S. Appl. No. 16/128,104 dated Dec. 12, 2019.
Restriction Requirement for U.S. Appl. No. 16/231,467 dated Feb. 5, 2020.
Advisory Action for U.S. Appl. No. 15/396,614 dated Oct. 24, 2019.
Corrected Notice of Allowance for U.S. Appl. No. 15/396,453 dated Aug. 21, 2019.
Corrected Notice of Allowance for U.S. Appl. No. 15/396,624 dated Sep. 5, 2019.
Final Office Action for U.S. Appl. No. 15/396,468 dated Nov. 6, 2019.
Final Office Action for U.S. Appl. No. 15/396,614 dated Aug. 12, 2019.
Non-Final Office Action for U.S. Appl. No. 15/396,475 dated Aug. 8, 2019.
Non-Final Office Action for U.S. Appl. No. 15/396,624 dated Oct. 16, 2019.
Non-Final Office Action for U.S. Appl. No. 15/986,218 dated Sep. 27, 2019.
Non-Final Office Action for U.S. Appl. No. 16/128,104 dated Aug. 21, 2019.
Supplemental Notice of Allowance for U.S. Appl. No. 15/396,624 dated Aug. 14, 2019.
Advisory Action for U.S. Appl. No. 15/396,475 dated May 13, 2020.
Corrected Notice of Allowance for U.S. Appl. No. 15/988,241 dated May 8, 2020.
Corrected Notice of Allowance for U.S. Appl. No. 16/128,104 dated Apr. 15, 2020.
Corrected Notice of Allowance for U.S. Appl. No. 16/128,104 dated May 20, 2020.
Final Office Action for U.S. Appl. No. 15/988,308 dated May 6, 2020.
Final Office Action for U.S. Appl. No. 15/986,286 dated Jun. 9, 2020.
Final Office Action for U.S. Appl. No. 15/986,406 dated May 26, 2020.
Final Office Action for U.S. Appl. No. 15/988,492 dated May 28, 2020.
Final Office Action for U.S. Appl. No. 16/229,310 dated Jun. 11, 2020.
Final Office Action for U.S. Appl. No. 16/229,497 dated Jun. 11, 2020.
Final Office Action for U.S. Appl. No. 16/230,268 dated Apr. 17, 2020.
Non-Final Office Action for U.S. Appl. No. 15/986,451 dated Apr. 16, 2020.
Non-Final Office Action for U.S. Appl. No. 16/229,614 dated Mar. 19, 2020.
Non-Final Office Action for U.S. Appl. No. 16/236,713 dated May 29, 2020.
Notice of Allowability for U.S. Appl. No. 15/986,361 dated May 15, 2020.
Notice of Allowance for U.S. Appl. No. 15/986,361 dated Apr. 8, 2020.
Notice of Allowance for U.S. Appl. No. 15/988,241 dated Mar. 18, 2020.
Notice of Allowance for U.S. Appl. No. 16/231,467 dated Apr. 16, 2020.
Notice of Allowance in U.S. Appl. No. 16/236,673 dated May 1, 2020.
Corrected Notice of Allowance for U.S. Appl. No. 15/988,241 dated Aug. 13, 2020.
Corrected Notice of Allowance for U.S. Appl. No. 15/988,241 dated Jun. 22, 2020.
Corrected Notice of Allowance for U.S. Appl. No. 16/128,104 dated Jul. 8, 2020.
Corrected Notice of Allowance for U.S. Appl. No. 16/236,673 dated Sep. 21, 2020.
Final Office Action for U.S. Appl. No. 15/988,572 dated Jul. 2, 2020.
Final Office Action for U.S. Appl. No. 16/229,614 dated Jul. 9, 2020.
Final Office Action for U.S. Appl. No. 16/234,870 dated Jul. 9, 2020.
Non-Final Office Action for U.S. Appl. No. 15/396,475 dated Aug. 6, 2020.
Non-Final Office Action for U.S. Appl. No. 15/988,308 dated Sep. 8, 2020.
Non-Final Office Action for U.S. Appl. No. 15/988,492 dated Sep. 10, 2020.
Notice of Allowability for U.S. Appl. No. 15/986,361 dated Aug. 18, 2020.
Notice of Allowability for U.S. Appl. No. 15/986,361 dated Jul. 14, 2020.
Notice of Allowance for U.S. Appl. No. 15/986,218 dated Jul. 13, 2020.
Notice of Allowance for U.S. Appl. No. 15/988,241 dated Aug. 26, 2020.
Notice of Allowance for U.S. Appl. No. 16/230,268 dated Aug. 24, 2020.
Notice of Allowance for U.S. Appl. No. 16/234,870 dated Aug. 19, 2020.
Corrected Notice of Allowance for U.S. Appl. No. 15/988,241 dated Nov. 18, 2020.
Corrected Notice of Allowance for U.S. Appl. No. 16/230,268 dated Dec. 2, 2020.
Corrected Notice of Allowance for U.S. Appl. No. 16/230,268 dated Oct. 9, 2020.
Corrected Notice of Allowance for U.S. Appl. No. 16/231,467 dated Nov. 20, 2020.
Corrected Notice of Allowance for U.S. Appl. No. 16/231,467 dated Oct. 1, 2020.
Corrected Notice of Allowance for U.S. Appl. No. 16/236,673 dated Oct. 23, 2020.
Final Office Action for U.S. Appl. No. 15/986,451 dated Sep. 29, 2020.
Final Office Action for U.S. Appl. No. 16/236,713 dated Sep. 30, 2020.
Non-Final Office Action for U.S. Appl. No. 15/986,406 dated Oct. 30, 2020.
Non-Final Office Action for U.S. Appl. No. 15/988,572 dated Nov. 6, 2020.
Non-Final Office Action for U.S. Appl. No. 16/902,775 dated Oct. 5, 2020.
Notice of Allowability for U.S. Appl. No. 15/986,361 dated Sep. 30, 2020.
Notice of Allowance for U.S. Appl. No. 16/229,310 dated Dec. 14, 2020.
Notice of Allowance for U.S. Appl. No. 16/236,713 dated Nov. 18, 2020.
Corrected Notice of Allowance for U.S. Appl. No. 16/234,870 dated Jan. 15, 2021.
Final Office Action for U.S. Appl. No. 15/988,308 dated Jan. 28, 2021.
Final Office Action for U.S. Appl. No. 15/988,492 dated Jan. 6, 2021.
Notice of Allowance for U.S. Appl. No. 16/229,497 dated Dec. 30, 2020.
Supplemental Notice of Allowance for U.S. Appl. No. 151986,218 dated Jan. 27, 2021.

(56) References Cited

OTHER PUBLICATIONS

Notice of Allowance for U.S. Appl. No. 16/902,775 dated Feb. 2, 2021.

* cited by examiner

PUBLISHING A PLURALITY OF DISPARATE LIVE MEDIA OUTPUT STREAM MANIFESTS USING LIVE INPUT STREAMS AND PRE-ENCODED MEDIA ASSETS

CROSS-REFERENCE TO RELATED APPLICATIONS/INCORPORATION BY REFERENCE

This patent application is a Continuation-in-part of U.S. patent application Ser. No. 15/396,475, filed on Dec. 31, 2016.

This application also makes reference to:
U.S. application Ser. No. 16/229,310, filed on Dec. 21, 2018;
U.S. application Ser. No. 16/229,497, filed on Dec. 21, 2018; and
U.S. application Ser. No. 16/229,614, filed on Dec. 21, 2018.

Each of the above referenced patent applications is hereby incorporated herein by reference in its entirety.

FIELD OF TECHNOLOGY

Certain embodiments of the disclosure relate to a television content packaging and distribution system. More specifically, certain embodiments of the disclosure relate to a method and system for publishing a plurality of disparate live media output stream manifests using live input streams and pre-encoded media assets.

BACKGROUND

Broadcasting platforms usually refer to types of networks that are used to deliver media content to viewers. Currently, all the broadcasting platforms, such as analog terrestrial broadcast, digital terrestrial broadcast, direct-to-home satellite broadcast, cable, Internet Protocol (IP), and over-the-top television (OTT), compete and strive to increase their appeal in order to gain wider audience.

Modern web streaming protocols, such as HTTP Live Streaming (HLS) and Dynamic Adaptive Streaming over HTTP (DASH), are implemented to support streaming of live content services, such as DIRECTV NOW[SM], SLING TV[SM] and PLAYSTAYION[SM] VUE, to consumer devices. Traditional service providers, such as COMCAST[SM], also have set-top boxes capable of receiving both legacy broadcast distribution protocols, as well as modern web streaming protocols. However, such traditional service providers are constrained by number of broadcast channels they can support on the legacy infrastructure and are more likely to allow more niche-based programming, using Internet-based distribution.

Technically, such modern web streaming protocols break media content into numerous small media content segments, typically less than 10 seconds in length. A manifest instructs a media player what media content segment to play next. The manifest and/or media content segment may also include and/or specify additional information to facilitate a media player to transition smoothly between media content streams from different sources. The manifest may be used for creating a playlist of multiple media content files, or for interrupting media content with advertising and then resuming the media content.

Such modern web streaming protocols support video-on-demand (VOD) assets and a live content as well. The VOD assets prepared for web distribution may have a sequence of short duration segments as well as a manifest that lists all the video segments that make up the full length of the media asset. On the other hand, in case of live content, new short content media segments are made available as soon as they are created. In some protocols, each new segment is added to the manifest while in others the player is provided necessary information to calculate what the next live segment will be. In the latter case, a signal in the media content itself is used to inform the player when to re-inspect the manifest for a change in media content.

Typically, in the broadcast industry, a live channel consists of media content that is pre-produced. A live channel requires the creation of an "Air Master" file that is played out, and on which channel branding graphics may be overlaid. The live channel has to be encoded in one more formats that are suitable for broadcast distribution. The live channel thus requires an expensive infrastructure. Further, additional cost is incurred due to providing a secondary encode and packaging to support distribution using the web streaming protocols.

Given the trends toward media content distribution using internet protocols, there is required a system to eliminate the need for a high cost broadcast infrastructure to publish disparate live media output streams using live input streams and pre-encoded media assets. Thus, an advanced and scalable system may be required that provides the network provider with an ability to provide a scalable architecture for publishing live media output streams in cost-effective manner.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for publishing a plurality of disparate live media output stream manifests using live input streams and pre-encoded media assets, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
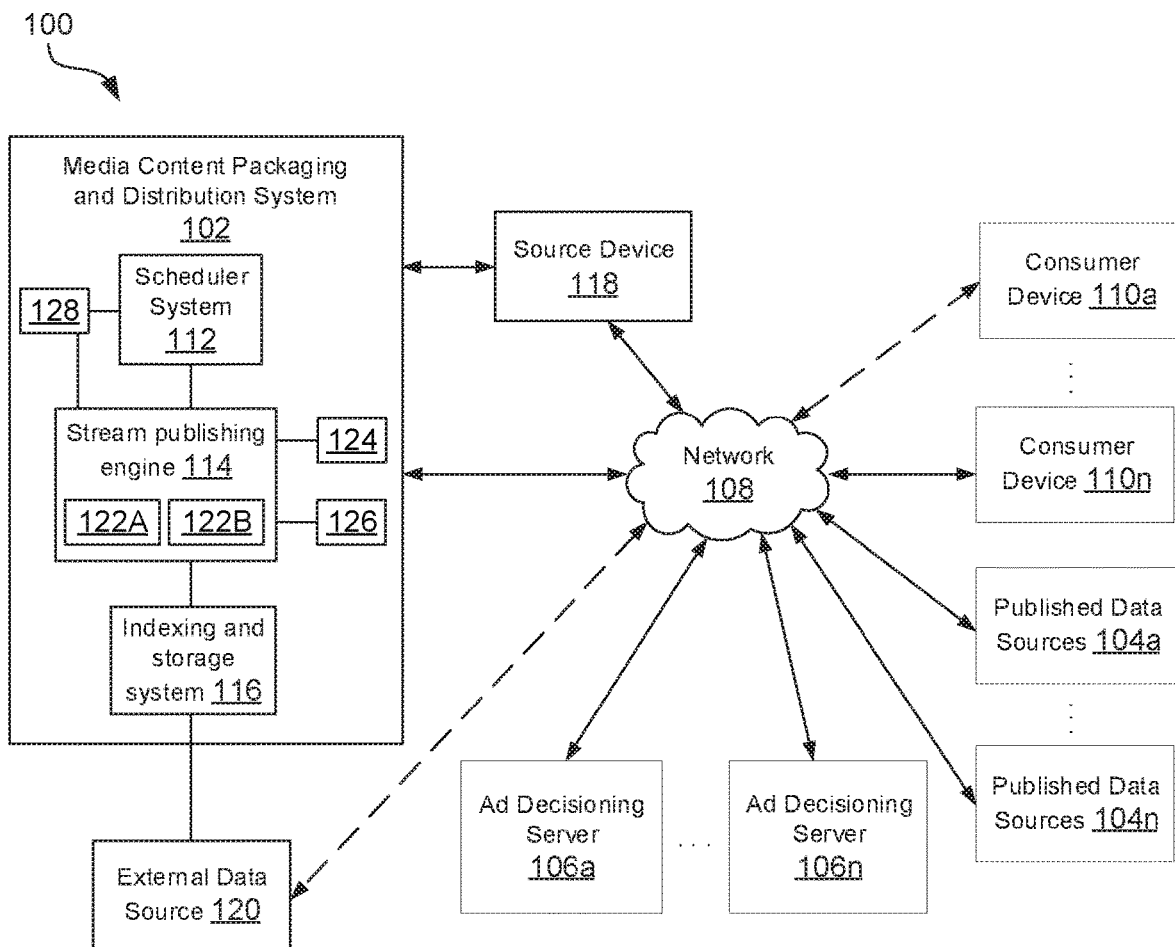
FIG. 1A is a block diagram that illustrates an exemplary system for publishing a plurality of disparate live media output stream manifests using live input streams and pre-encoded media assets, in accordance with an exemplary embodiment of the disclosure.

Certain embodiments of the disclosure may be found in a method and system for publishing a plurality of disparate live media output stream manifests using live input streams and pre-encoded media assets. Various embodiments of the disclosure provide a method and system that simplifies live channel creation and provides the network provider with an ability to not only provide live channel offerings in cost-effective manner but also provide enhanced viewer experience to increase their appeal in order to gain wider audience.

In accordance with various embodiments of the disclosure, a media packaging and distribution system is provided that may be configured to publish a plurality of disparate live media output stream manifests to be viewed on a plurality of consumer devices. The media packaging and distribution system may comprise one or more processors configured to ingest manifest metadata into a manifest metadata storage system. For the ingestion of the manifest metadata into the manifest metadata storage system, the one or more processors may be configured to issue the plurality of first instructions into an instruction queue. Each of first instruction of the plurality of first instructions may comprise at least an instruction type, a priority level, and a location of an input manifest. The one or more processors may be further configured to allocate each of the plurality of first instructions to a corresponding first worker of the plurality of first workers based on the instruction type and the priority level. Each of the plurality of first workers may read first manifest data, which is non-ingested metadata, of a plurality of live input streams and/or a second manifest data of a plurality of pre-encoded media assets from locations of corresponding input manifests. The one or more processors may be further configured to determine a first manifest metadata and a second manifest metadata based on validation and parsing of the first manifest data and second manifest data read from the locations of corresponding input manifest. The one or more processors may be further configured to store (or ingest) the determined first manifest metadata of the plurality of live input streams and a second manifest metadata of a plurality of pre-encoded media assets with corresponding indices in the manifest metadata storage system.

The one or more processors may be further configured to issue a plurality of second instructions to the instruction queue. A second instruction from the plurality of second instructions may comprise at least a state of published data that includes a disparate live output stream manifest and information associated with the ingested manifest metadata. The one or more processors may be further configured to allocate a second instruction from the plurality of second instructions to a second worker from the plurality of second workers. The second worker may insert a next manifest segment to a disparate live output stream manifest upon reading the next manifest segment to be published for each bitrate variant from the ingested manifest metadata. The one or more processors may be further configured to generate the plurality of disparate live media output stream manifests for each of the plurality of channels to be viewed on the plurality of consumer devices based on the disparate live output stream manifest.

FIG. 1A is a block diagram that illustrates an exemplary system for publishing a plurality of disparate live media output stream manifests using live input streams and pre-encoded media assets, in accordance with an exemplary embodiment of the disclosure. Referring to FIG. 1A, the system 100, comprises a media packaging and distribution system 102 that is communicatively coupled to published data sources 104a, . . . , 104n, and Ad decisioning servers 106a, . . . , 106n, via a network 108 and/or other programmatic means. There are shown consumer devices 110a, . . . , 110n that are also communicatively coupled to the network 108. The media packaging and distribution system 102 may comprise at least a scheduler system 112, a stream publishing engine 114, and an indexing and storage system 116. There is also shown a source device 118 communicatively coupled to the scheduler system 112 and the network 108. An external data source 120 is also provided, which is communicatively coupled to the indexing and storage system 116, and the network 108.

The media packaging and distribution system 102 may comprise suitable logic, circuitry, and interfaces that may be configured to execute code that handles content comprising audio, video, images, metadata, manifests, and/or other data (embedded and/or externally referenced). In this regard, the media packaging and distribution system 102 may provide video programming services to viewers, usually for a subscription fee (such as pay television). The media packaging and distribution system 102 generates a plurality of disparate live media output streams to be viewed on the plurality of consumer devices 110a, . . . , 110n. The media packaging and distribution system 102 also handles distribution, for example, multicasting, unicasting, broadcasting, streaming, for one or more channels to be viewed on one or more of the plurality of consumer devices 110a, . . . , 110n. The media content may include a video, an audio, a combination of audio and video presentations, a combination of audio, video, and/or embedded or externally referenced metadata, a combination of multiple-audio, multiple-video, and/or embedded or externally referenced metadata. The media content may also include metadata associated with the audio/video presentation, such as game scores, statistics, or timings, social media, cast/character/credits, geo-spatial data, and/or still-images or graphics (referenced or embedded).

The media packaging and distribution system 102 may be operated by an entity related to handling or distribution of media content, for example, a broadcast provider or operator, or a network provider or network operator. The entity related to handling or distribution of media content may also be referred to as a content owner, a distributor, a syndicator, a re-distributor, a content aggregator, a search, discovery, or cataloging service provider, or any other entity actively or passively involved with the distribution, cataloging, or referencing of complete or partial presentations of media content. Throughout this document, the terms broadcast provider or broadcast operator, and network provider or network operator may be utilized to refer to the entity related to handling or distribution of media content, interchangeably. The broadcast provider may handle a single channel, a plurality of channels, or one or more networks. The broadcast provider may be configured to distribute content via one or more platforms, for example, traditional over-the-air broadcast channels, radio, cable television networks, satellite communication networks, the Internet, and/or other content delivery networks. In this regard, the broadcast provider may be configured to execute code that communicates linear video feeds (also referred to as a network television feed or broadcast feed) and corresponding playout schedule to the media packaging and distribution system 102. In a broadcast chain, the broadcast provider may receive actual content, for example, from a production studio, in one or more source formats. Examples of the one or more source formats may include, but are not limited to a tape file, or a live feed that may be further converted to a serial digital interface (SDI) video interface and/or on a high-definition SDI (HD-SDI) video interface for processing and playout. The broadcast provider may further process the content, such as insertion of graphics, closed captions, preparation of programming schedule, insertion of triggers, and the like, and final delivery by a broadcasting apparatus. The communicated linear video feed and the playout schedule may correspond to a channel, such as CNN channel that is broadcast to the media packaging and distribution system 102, via a communication network. The linear video feed may be broadcasted as a multi-program transport stream (MPTS) (also referred to as a live video feed) to the media packaging and distribution system 102, via the network 108. The broadcast provider may be owned by (or associated to) a broadcast provider or operator, a network provider or operator, or a content provider or operator.

The media packaging and distribution system 102 may receive the MPTS, which includes the signaling content and metadata, from the broadcast provider based on, for example, current society of cable telecommunication engineers (SCTE) standards (SCTE-35 and SCTE-224) to control web and regional blackouts, network end of day switching, and advertisement insertion. For example, the media packaging and distribution system 102 may be signaled for various blackout types with in-band SCTE-35 message. Further, the media packaging and distribution system 102 may receive program metadata that specifies certain events or operations, such as, for example, when to blackout shows, recording programs off the live video feed for startover or Cx (x is an integer representing the number of day since original airing) VOD packaging, with SCTE-224 message. Examples of legacy distribution system that may be benefitted from the media packaging and distribution system 102 may include direct-broadcast satellite (DBS) providers, cable television (CATV) systems, and other wireline video providers and competitive local exchange carriers (CLECs) using for example, IPTV.

Each of the plurality of published data sources 104a, . . . , 104n may be coupled to one or more television networks and may comprise suitable logic, circuitry, and interfaces that may be configured to execute code that provides actual audiences for programs that were distributed. As illustrated in FIG. 1A, the plurality of published data sources 104a, . . . , 104n are coupled to the media packaging and distribution system 102 via the network 108. The plurality of published data sources 104a, . . . , 104n may provide actual audiences for programs to the indexing and storage system 116. An exemplary published data source may be Nielsen. Nielsen has the capability to determine when a viewer watches the same set of media items, i.e. advertisements and/or promotional content, in programming data, such as an episode, in a live video feed within 3 days of original airing and provide Nielsen "C3" credit. In accordance with an embodiment, based on the Nielsen "C3" credit, a new channel, "D4 channel" may be created by a broadcast provider system, which may be broadcasted on day "4" of the originally aired live video feed. Another exemplary published data source may be a published database that provides ratings for a media item, such as gross rating point (GRP). The GRP is an advertising or promotion impact measure for each advertising and/or promotional campaigns, known in the art. Other exemplary published data sources may also include direct/indirect access to other public or private data sources (persistent or ephemeral) through programmatic means.

The Ad decisioning servers 106a, . . . , 106n may comprise suitable logic, circuitry, and interfaces that may be configured to implement at least an advertisement decisioning component that may be used during a real-time content or advertisement placement activity, for example during dynamic ad insertion. For example, commercial or non-commercial advertisements may be dynamically inserted within program segments of a media asset by the Ad decisioning servers 106a, . . . , 106n based on the upcoming indicator detected by the media player or the non-programming content proxy server. The detected indicator may be, for example, such as an inbound trigger, a signaling point, and/or a signal in a source stream. The Ad decisioning servers 106a, . . . , 106n may receive a request for retrieval of non-programming content, i.e. ads, from a non-programming content proxy server (not shown). Specifically, the Ad decisioning servers 106a, . . . , 106n may receive the request from one or more of the plurality of consumer devices 110a, . . . , 110n, via the non-programming content proxy server (not shown in FIG. 1). The request may be received when one or more indicators and/or pre-encoded place holder content segment for a scheduled duration of one or more non-programming content breaks, as defined by the received programming schedule, are encountered in the disparate live media output stream manifest during media content playout by media players at the one or more of the plurality of consumer devices 110a, . . . , 110n.

Thus, for requests from the plurality of consumer devices 110a, . . . , 110n, based on corresponding disparate live media output stream manifests, the Ad decisioning servers 106a, . . . , 106n may identity the opportunities for the real-time content or advertisement placement activity. In this regard, as the advertisement decisioning component of the Ad decisioning servers 106a, . . . , 106n is implemented in a client device, such as one or more of the plurality of consumer devices 110a, . . . , 110n, the Ad decisioning servers 106a, . . . , 106n may identify real-time content or advertisement placement opportunity for dynamic ad insertion. For example, commercial or non-commercial advertisements may be dynamically inserted within program segments of a media feed based on the detected indicator, such as upcoming inbound trigger, signaling point, and/or signal, in the disparate live media output stream manifest by the Ad decisioning servers 106a, . . . , 106n when the ad decisioning component is implemented in the client device. In various embodiments, the advertisement decisioning component of the Ad decisioning servers 106a, . . . , 106n may be configured to determine which advertisements, overlay graphics and presentation information to serve to the consumer devices 110a, . . . , 110n based on stream ID, a program ID, a geolocation, time, and any preferences associated with an individual consumer or an advertisement ID specified by the disparate live media output stream manifest.

The network 108 may be any kind of network, or a combination of various networks, and it is shown illustrating the communication that may occur between the Ad decisioning servers 106a, . . . , 106n and the media packaging and distribution system 102. For example, the network 108 may comprise one or more of a cable television network, the Internet, a satellite communication network, a wide area network (WAN), a medium area network (MAN), and a local area network (LAN). Although a network 108 is shown, the disclosure is not limited in this regard; accordingly, other exemplary modes may comprise uni-directional or bi-directional distribution, such as packet-radio, satellite. Furthermore, the network 108 is an exemplary embodiment of a distribution system.

The consumer devices 110a, . . . , 110n may refer to end-user devices or consumption devices where the content is played and consumed by a user. The number of impressions of a media item, such as an advertisement and/or promotional media, on such plurality of consumer devices 110a, . . . , 110n may determine the advertising impact or promotion impact and number of actual audiences achieved during campaigns. Examples of the consumer devices 110a, . . . , 110n may include, but are not limited to connected TVs, connected TV with paired and/or connected devices (e.g., HDMI sticks, tablets), personal computer, smartphone, tablet, OTT set-top, or hybrid set-top, and second screen devices such as smartphones, tablets, game consoles, personal computers, set-top boxes, embedded devices, or any process/system capable of processing the output for any means, regardless of the capability or intent to decode for media presentation, and on which the consumer may launch a web page, a web application, or a web service to view media content.

The scheduler system 112 may comprise suitable logic, circuitry, and interfaces that may be configured to execute code that creates and handles a plurality of initial instructions and a programming schedule of pre-encoded (or on-demand) media assets metadata and/or live input stream metadata for a channel. The programming schedule for the channel defines which pre-encoded media assets and/or live input streams should be scheduled, time and duration at which the pre-encoded media assets and/or live input streams should be played in the generated disparate live media output streams, the ordering of the pre-encoded media assets and/or live input streams during playout, and when to distribute the media content to the consumer devices 110a, . . . , 110n over the web application, service or page. The scheduler system 112 may create the programming schedule based on a desired theme, content metadata, content rights, content eligibility, and content availability of pre-encoded media assets and/or live input streams. The scheduler system 112 may also provide an ability to format non-programming break, such as ad break, durations and locations, as well as graphic overlay locations in the pre-encoded media assets and/or live input streams displayed on the consumer devices 110a, . . . , 110n.

Figure 1B:
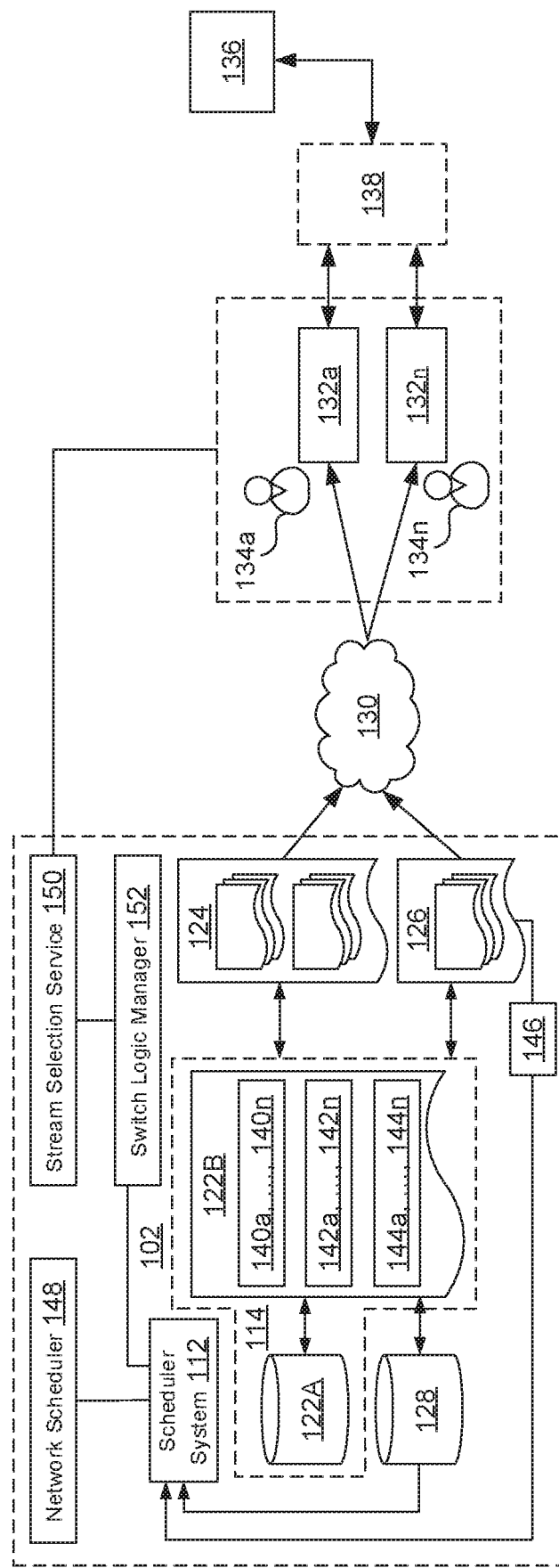
FIG. 1B is a block diagram that illustrates an exemplary media packaging and distribution system for publishing a plurality of disparate live media output stream manifests using live input streams and pre-encoded media assets, in accordance with an exemplary embodiment of the disclosure.

The stream publishing engine 114 may comprise suitable logic, circuitry, and interfaces that may be configured to execute a code to ingest manifest metadata associated with the pre-encoded media assets and/or live input streams in manifest metadata storage system, described in FIG. 1B. The stream publishing engine 114 may further generate a disparate live media output stream for a new channel to be viewed on a consumer device, in accordance with the specified play schedule, such as the generated new programming schedule. The stream publishing engine 114 may be configured to generate live media output streams by publishing unique streaming live media output stream manifests leveraging different indices created by the indexing and storage system 116 from the various pre-encoded media assets and live input streams, based on the generated programming schedule. In accordance with an embodiment, the stream publishing engine 114 may be configured to insert media segments that are referenced by manifests associated with the plurality of pre-encoded media assets and/or live input streams into a disparate live media output stream manifest. The disparate live media output stream, thus generated, is in a suitable state (or ready) to be distributed to web media players in one or more of the plurality of consumer devices 110a, . . . , 110n without a requirement to re-encode the pre-encoded media assets before the web distribution of the disparate live media output stream for the new channel.

In this regard, the disparate live media output stream may be tailored for a single consumer device, or for a plurality of the consumer devices 110a, . . . , 110n. The decisioning as to which pre-encoded media assets or live input streams to select for delivery over the network 108 to the one or more of the plurality of consumer devices 110a, . . . , 110n may be based on the manipulation of the manifests that correspond to the programming schedules in real time or near-real time. The manipulation of the manifests may be based on the programming schedules that may be driven by, for example real time or near-real time content context analysis, user-selection on the consumer devices 110a, . . . , 110n, or external data received from the external data source 120, in addition to the real-time data, such as desired channel theme, content metadata, pre-specified content rights, content availability, content eligibility, and stream operator preferences, received from various databases, as described in detail in FIG. 1B. The stream publishing engine 114 may also be referred to as a stream manipulator that may be configured to insert media segments from live content or pre-stored media content, in an existing program stream, based on manipulation of manifests corresponding to programming schedule of the existing program stream, such as an existing channel. The insertion of live content, pre-stored media content, pre-encoded media assets, and/or the like may be driven by real time or near-real time content context analysis, user-selection on the consumer devices 110a, . . . , 110n, or driven by external data received from the external data source 120. Alternatively, both the live or pre-stored programming content (such as long-form presentations, short-form presentations, news or sporting events) and non-programming content (such as paid advertisements, public service advertisements, or promotional material), may be dynamically scheduled, and inserted to create new channels based on real time or near-real time (or with a certain lag time) manipulation of the manifest corresponding to the programming schedule.

The indexing and storage system 116 may comprise suitable logic, circuitry, and interfaces that may be configured to store pre-encoded media content segments, such as VOD assets, live content segments, and metadata related to the pre-encoded media content segments and the live content segments. The indexing and storage system 116 may be further configured to be ingested with a plurality of manifests associated with the plurality of pre-encoded media assets. The indexing and storage system 116 may also store, process, and generate aggregate viewing information based on various data feeds received from the external data source 120 and the published data sources 104a, . . . , 104n. In accordance with an embodiment, the indexing and storage system 116 may be configured to ingest the manifests of the pre-encoded media assets, and perform indexing of the listed media segments, indexing of program boundaries and tag markings, advertisement break locations, overlay opportunities credits, digital rights management systems supported in the indexing and storage system 116.

The source device 118 may comprise suitable logic, circuitry, and interfaces that may be configured to communicate a live media feed and a programming schedule of a channel, such as an existing channel, to the media packaging and distribution system 102. In accordance with an embodiment, the media feed of the channel may correspond to a broadcast feed. The source device 118 may be communicatively coupled to the network 108.

The external data source 120 may comprise suitable logic, circuitry, and interfaces that may be configured to execute code that handles retrieval and storage of audience data that corresponds to subscribers of the plurality of consumer devices 110*a*, . . . , 110*n*. The audience data may include demographics data, audience targeting data, trending data, device type data, device platform data, and content recognition-based data, such as automatic content recognition (ACR)-based data. The trending data comprises information of what's trending in the social networks (or platforms), such as Twitter®, Facebook®, and the like. The trending data also comprises information of what's trending based on social engagement, such as number of likes or votes to a particular media item, or number of people watching a particular media item. The trending data may indicate an aggregate interest level of a number of users in the social networks for a particular media item. For example, a thousand or more shares, or likes by a number of users may indicate a highly popular media item.

The publishing engine instruction queue 122A may be a data set storage configured to receive a plurality of initial instructions from the scheduler system 112. The publishing engine instruction queue 122A may further store the plurality of initial instructions, and sort and/or categorize the plurality of initial instructions based on respective functionalities. The plurality of instructions may be categorized as a plurality of first, second and third instructions, as described in detail in FIG. 1B. The publishing engine instruction queue 122A may later transmit the plurality of first, second and third instructions to the publishing engine workers pool 122B based on type of task to be performed.

The publishing engine workers pool 122B comprises multiple instances of a processor (referred to as a worker or a publishing engine worker). Such multiple instances of the processor may request or be assigned with one or more series of instructions from the publishing engine instruction queue 122A. The request may pertain to creation, maintenance, and/or monitoring of various executions of other instructions associated with a pre-encoded media assets and/or live input streams. Other capabilities of the publishing engine workers pool 122B are described in detail in FIG. 1B The live content storage system 124 may comprise suitable logic, circuitry, and interfaces that may be configured to store live input streams and corresponding first manifest data. The live content storage system 124 may be used as a source for the live input streams and corresponding first manifest data required for clients in the designated formats, such as DASH and HLS.

The media content storage system 126 may comprise suitable logic, circuitry, and interfaces that may be configured to store master versions of the pre-encoded assets and corresponding second manifest data. The master versions may be used as the source for creating the On-Demand or pre-encoded media assets and corresponding manifests, based on which disparate live media output steams for clients may be generated in required formats.

The manifest metadata storage system 128 may comprise suitable logic, circuitry, and interfaces that may be configured to store manifest metadata associated with the plurality of pre-encoded media asset manifests and/or the plurality of live input stream manifests. The manifest metadata may include metadata associated with indexed manifests associated with live input streams and pre-encoded media assets stored in the live content storage system 124 and the media content storage system 126, respectively.

In operation, the scheduler system 112 may detect an availability of pre-encoded media asset manifests and/or live input stream manifests within the manifest metadata storage system 128. The scheduler system 112 may then issue a first instruction, for example ingestion instructions, into the publishing engine instruction queue 122A. The ingestion instructions may include, for example, one or more instructions of an instruction type (i.e. ingestion), location of the pre-encoded media asset manifests and/or live input stream manifests, playback rights associated with pre-encoded media assets, encoding and DRM metadata associated with the pre-encoded media asset manifests and/or live input stream manifests, an expiration date for the ingested metadata, date/time the instruction was issued, date/time the instruction should be completed, and execution priority.

The publishing engine instruction queue 122A may place the ingestion instructions amongst other instructions in an order matching rules governed by instruction execution priority, date/time the instruction required to be completed by, and type of instruction (for example, ingestion instructions). As publishing engine workers from the publishing engine workers pool 122B becomes available for further instruction, the publishing engine workers may take ownership of the ingestion instructions from the publishing engine instruction queue 122A. The publishing engine workers may then read first and second manifest data associated with the pre-encoded media asset manifests and/or live input stream manifests from the input manifest locations, such as media content storage system 126 and/or live content storage system 124, specified in the ingestion instructions. From the live input stream manifests, publishing engine workers may read only that information that has not currently been ingested.

The publishing engine workers may validate and parse the first and second manifest data into first and second manifest metadata that meets requirements necessary to be used in future instructions. The publishing engine workers may further add rights, preferences, and encoding metadata found in the ingestion instructions to the first and second manifest metadata. The publishing engine workers may further index and store the first and the second manifest metadata in the manifest metadata storage system 128 and set an expiration date/time on the record representing the first and second manifest metadata in the manifest metadata storage system 128. For the live input steam manifests that constantly are updated with new information, the publishing engine worker may issue a new ingestion instruction to the publishing engine instruction queue 122A. The new ingestion instruction may comprise data including, for example, identical information from the processed ingestion instruction, the last ingested segments, the last date/time of ingestion, and the expiration date/time of the current ingested first and the second manifest metadata. The state of the publishing engine worker may then convert into an available state and may be ready to take an ownership of the next ingestion instruction in the publishing engine instruction queue 122A.

In accordance with another aspect of the disclosure, the scheduler system 112 may present a representation of pre-encoded media assets and/or live input streams by way of the ingested manifest metadata stored in the manifest metadata storage system 128 to a user associated with a consumer device, for example the consumer device 110*a*. The user may then use the scheduler system 112 to issue a publish instruction to the publishing engine instruction queue 122A for the pre-encoded media asset manifests and/or live input stream manifests.

The issued publish instruction may include state-of-publish data which indicates a reference to the first and/or the second manifest metadata stored in the manifest metadata storage system 128. The issued publish instruction may further include the last manifest segment that was published, the date/time of the last publish date, the designated plurality of disparate live media output stream manifests, and the next manifest segment to be published which is may include a reference to another segment corresponding to another pre-encoded media assets and/or live input streams, allowing the chaining of pre-encoded media assets and/or live input streams. The issued publish instruction may further include information, such as indicators and triggers, needed to support ad insertion, DRM-required information, or other authentication requirements.

Available publishing engine workers from the publishing engine workers pool 122B, which are currently available and not processing a prior instruction, may take ownership of the publish instructions from the publishing engine instruction queue 122A. The publishing engine worker may then read the next manifest segment corresponding to the first and/or the second manifest metadata. The publishing engine worker may then insert the next manifest segment to disparate live media output stream manifest based on a programming schedule generated by the scheduler system 112. The publishing engine worker may further update appropriate data within the disparate live media output stream manifest to facilitate the newly inserted manifest segment. The publishing engine worker may further update state-of-publish data indicating the last manifest segment that was published, the next manifest segment to be published, and the date/time of the last publish date. Once the execution of the publish instruction is complete, the publishing engine worker may send an acknowledgement of completion to the publishing engine instruction queue 122A. The publishing engine instruction queue 122A may remove the publish instruction from the queue of instructions. The publishing engine worker may then issue a new publish instruction to the publishing engine instruction queue 122A, with the publish instruction having the same data as the original publish instruction, but with the updated state-of-publish data. The state of the publishing engine worker may then convert to an available state, and the publishing engine worker may be ready to take ownership of the next instruction in the publishing engine instruction queue 122A.

In accordance with another aspect of the disclosure, available publishing engine workers from the publishing engine workers pool 122B, which are currently available and not processing a prior instruction, may take ownership of the monitor instructions from the publishing engine instruction queue 122A. The publishing engine worker may then monitor the overall performance of the media packaging and distribution system 102 and also other instructions in execution, such as ingestion instructions and publish instructions. Once the execution of the monitor instruction is complete, the publishing engine worker may send an acknowledgement of completion to the publishing engine instruction queue 122A. The state of the publishing engine worker may then convert to an available state, and the publishing engine worker may be ready to take ownership of the next instruction in the publishing engine instruction queue 122A.

FIG. 1B is a block diagram that illustrates an exemplary media packaging and distribution system for publishing a disparate live media output stream using pre-encoded media assets, in accordance with an exemplary embodiment of the disclosure. Referring to FIG. 1B, there is illustrated the scheduler system 112 and the stream publishing engine 114. The stream publishing engine 114 may comprise a publishing engine instruction queue 122A and a publishing engine workers pool 122B. The publishing engine workers pool 122B may include a plurality of first workers 140a, . . . , 140n, a plurality of second workers 142a, . . . , 142n, and a plurality of third workers 144a, . . . , 144n. The media packaging and distribution system 102 may further comprise a live content storage system 124, a media content storage system 126, a manifest metadata storage system 128, an external monitoring system 146, a network scheduler 148, a stream selection service 150, and a switch logic manager 152. The media content storage system 126 and manifest metadata storage system 128 may be coupled with the indexing and storage system 116, via a media encoder packager (not shown). There are also shown a content delivery system 130, which is an example of the network 108, client devices 132a, . . . , 132n, which correspond to the plurality of consumer devices 110a, . . . , 110n, and users 134a, . . . , 134b associated with the client devices 132a, . . . , 132n, for example. There are also shown an Ad decisioning server 136 (corresponding to one or more of the Ad decisioning servers 106a, . . . , 106n in FG. 1A), and a non-programming content proxy server 138.

In some embodiments of the disclosure, the scheduler system 112, the stream selection service 150, and the switch logic manager 152 may be integrated to form an integrated system. In some embodiments of the disclosure, as shown, the scheduler system 112, the stream selection service 150, and the switch logic manager 152 may be distinct. Other separation and/or combination of the various entities of the exemplary media packaging and distribution system 102 illustrated in FIG. 1B may be done without departing from the spirit and scope of the various embodiments of the disclosure.

In some embodiments of the disclosure, as illustrated in FIG. 1B, the publishing engine workers pool 122B including the plurality of first workers 140a, . . . , 140n, the plurality of second workers 142a, . . . , 142n, and the plurality of third workers 144a, . . . , 144n may be a part of the stream publishing engine 114 and forms an integrated system. However, in some embodiments of the disclosure, the publishing engine workers pool 122B including the plurality of first workers 140a, . . . , 140n, the plurality of second workers 142a, . . . , 142n, and the plurality of third workers 144a, . . . , 144n may be distinct and not a part of the stream publishing engine 114 in the media packaging and distribution system 102. Other integrated systems comprising the publishing engine workers pool 122B, for example, integration of the publishing engine workers pool 122B within a client device, may be possible without departing from the spirit and scope of the various embodiments of the disclosure.

The publishing engine instruction queue 122A may be a data set storage configured to receive a plurality of initial instructions from the scheduler system 112. The publishing engine instruction queue 122A may further store the plurality of initial instructions. The publishing engine instruction queue 122A may sort and/or categorize the plurality of initial instructions, hereinafter plurality of instructions, based on respective functionalities. The plurality of instructions may be categorized as a plurality of first, second and third instructions. The publishing engine instruction queue 122A may later transmit the plurality of first, second and third instructions to the publishing engine workers pool 122B based on type of task to be performed.

In accordance with an embodiment, the plurality of first instructions from the plurality of instructions may be configured to ingest first and second manifest metadata in the manifest metadata storage system 128. The plurality of first instructions may describe and support ingestion of manifest metadata of the plurality of pre-encoded media assets and the plurality of live video assets into the manifest metadata storage system 128.

In accordance with another embodiment, the plurality of second instructions from the plurality of instructions may be configured to publish a disparate live media output stream (composed of the ingested pre-encoded media assets and/or live input streams) in the live content storage system 124.

In accordance with another embodiment, the plurality of third instructions from the plurality of instructions may be configured to monitor overall performance of the media packaging and distribution system 102. The plurality of third instructions may further monitor various tasks associated with the construction and execution of other instructions and maintain the publishing engine instruction queue 122A intact. Examples of such tasks may include, but are not limited to, monitoring performance over the timeliness of the execution of instructions, monitoring the number of processor instances required to maintain timely execution of the instructions, reporting the current state of instruction execution to external monitoring system, and removal of obsolete and unnecessary manifest metadata from manifest metadata storage system 128, creation and destruction of a disparate live media output stream to start or end publishing.

In accordance with various embodiments, the publishing engine instruction queue 122A may store the plurality of instructions and facilitate various tasks associated with the plurality of instructions. The publishing engine instruction queue 122A may sort the plurality of instructions according to the timing requirements of execution. The publishing engine instruction queue 122A may allow the publishing engine workers pool 122B to own the plurality of instructions until completed or an execution period has timed out. Such plurality of instructions owned by workers in the publishing engine workers pool 122B are not removed from the publishing engine instruction queue 122A but are not assigned to any other workers in the publishing engine workers pool 122B. The publishing engine instruction queue 122A may further remove one or more instructions that are successfully executed by a worker in the publishing engine workers pool 122B. In accordance with an embodiment, the plurality of instructions may be generated externally by the scheduler system 112. In accordance with another embodiment, the plurality of instructions may be generated internally by the workers in the publishing engine workers pool 122B. The publishing engine instruction queue 122A may further perform chaining an assembly of multiple pre-encoded assets and live media assets together to generate disparate live media output stream.

The publishing engine workers pool 122B comprises multiple instances of a processor (also referred to as a worker or a publishing engine worker). Such multiple instances of the processor may request or be assigned with one or more series of instructions from the publishing engine instruction queue 122A. The request may pertain to creation, maintenance, and/or monitoring of various executions of other instructions associated with a pre-encoded media assets and/or live input streams. Each processor instance may be autonomous and unaware of other workers. Each processor instance may create additional worker instances or destroy existing worker instances. Each processor instance may execute a pre-defined publishing instruction one at a time or create a pre-defined publishing instruction. All the processor instances are identical, yet each operating in an isolated context. Number of such processor instances may be scaled up or down based on a level of concurrent execution of the instructions.

Each processor instance may be allocated an instruction from the publishing engine instruction queue 122A for execution. For example, the instruction may be "Take this show and publish next 10 s segment on the live stream". Once the worker has completed the execution of the allocated instruction and there is no other instruction in the publishing engine instruction queue 122A, the final task of the worker is to create next chain of instructions. While the original instruction of the worker remains in the publishing engine instruction queue 122A, the worker (once executed the original instruction) may create new instruction, for example "Retrieve the next 10 s segment for publishing". The worker may insert the new instruction in the publishing engine instruction queue 122A, thereby creating a chain of instructions. The publishing engine instruction queue 122A may allocate the new instruction to next available worker.

The live content storage system 124 may comprise suitable logic, circuitry, and interfaces that may be configured to store live input streams and corresponding first manifest data. The live content storage system 124 may be used as the source for the live input streams and corresponding first manifest data required for clients in the designated formats, such as DASH and HLS. For example, disparate live media output steam manifests may be generated by the plurality of second workers 142a, . . . , 142n using the plurality of second instructions based on a first manifest metadata in addition to a second manifest metadata. The live content storage system 124 may further store disparate live media output stream manifests thus generated by the plurality of second workers 142a, . . . , 142n using the plurality of second instructions. While the information in disparate live media output stream manifests is read by the media player of the client device 132a, for example, the live content storage system 124 may be configured to provide live input stream media segments referenced in the disparate live media output stream manifests during playout.

The media content storage system 126 may comprise suitable logic, circuitry, and interfaces that may be configured to store master versions of the pre-encoded assets and corresponding second manifest data. The master versions may be used as the source for creating the On-Demand or pre-encoded media assets and corresponding manifests, based on which disparate live media output steams for clients may be generated in required formats. The media content storage system 126 may further store the second manifest data associated with the pre-encoded media assets. The disparate live media output steam manifests may be generated by the plurality of second workers 142a, . . . , 142n using the plurality of second instructions based on the second manifest metadata in addition to the first manifest metadata. The media content storage system 126 may be further configured to publish the disparate live media output stream manifests in the content delivery system 130. While the information in disparate live media output stream manifests is read by the media player of the client device 132a, for example, the media content storage system 126 may be configured to provide pre-encoded media asset segments referenced in the disparate live media output stream manifests during playout.

The manifest metadata storage system 128 may comprise suitable logic, circuitry, and interfaces that may be configured to store manifest metadata associated with the plurality of pre-encoded media asset manifests and/or the plurality of live input stream manifests. The manifest metadata may include metadata associated with indexed manifests associated with live input streams and pre-encoded media assets stored in the live content storage system 124 and the media content storage system 126, respectively. Examples of the manifest metadata may include, but are not limited to, a media content identifier, a title of the media content, type of the media content (such as movie series (season episode number)), genre, plot summary, duration, advertisement break locations, credit locations, scene descriptions, a short summary of the media content segments, a short summary of ideal advertisement placements within the content, and a file format. Examples may further include digital right management (DRM), encryption information, length of the media content, a date and/or time the media content was added to the catalog of media content, and a new item indicator for the media content (e.g., a new media asset that became available within the last 24 hours, last few days, last week, and/or the like). Examples may further include a media content class, for example, a television show, a cartoon program, a movie, a news media, an episode, a game, a clip, a recorded sports event, interactive media, and/or the like. In accordance with an exemplary embodiment, the manifest metadata storage system 128 may also store program-specific information (PSI) data as defined by ISO/IEC 13818-1 (MPEG-2), closed captioning data, and subtitles associated with the media content segments stored in the media content storage system 126. Other forms of metadata may be utilized without departing from the spirit and scope of the various embodiments of the disclosure.

The content delivery system 130 may correspond to the network 108. The content delivery system 130 may comprise networks configured for distributing media content. Generally, the term "content," "metadata," "media," and similar words are used interchangeably to refer to any type of media—audio, videos, datacasts, music, text, images, graphics, articles, photos, photo galleries, video galleries, infographics, maps, polls, guest biographies, tweets or other social media, blog posts, and/or the like. In an embodiment, the content delivery system 130 may comprise media storage (not shown). The content delivery system 130 may be configured to provide the plurality of client devices 132a, . . . , 132n with disparate live media output streams via transport stream, segmented streaming, progressive download, or any other modes of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

The client devices 132a, . . . , 132n may correspond to consumer devices 110a, . . . , 110n. In accordance with an embodiment, the client devices 132a, . . . , 132n may be content recognition-enabled devices. The client devices 132a, . . . , 132n may be configured to communicate with the Ad decisioning server 136 and/or the non-programming content proxy server 138, via the content delivery system 130, or a separate communication network. For example, as illustrated in FIG. 1B, the client devices 132a, . . . , 132n may be associated with users 134a and 134n, respectively. The client devices 132a, . . . , 132n may generate requests to the Ad decisioning server 136 for non-programming content during media content playout by media players at the client devices 132a, . . . , 132n. The requests may be generated when the media players in the client devices 132a, . . . , 132n encounter one or more indicators and/or pre-encoded place holder content segment for a scheduled duration of one or more non-programming content breaks, as defined by the programming schedule, in the disparate live media output stream manifest.

The Ad decisioning server 136 may comprise suitable logic, circuitry, and interfaces that may be configured to execute code to determine which advertisements, overlay graphics and presentation information to serve to the client devices 132a, . . . , 132n based on a stream ID, a program ID, a geolocation, time, and preferences associated with an individual users 134a, . . . , 134n or advertisement ID. The Ad decisioning server 136 may receive requests from the client devices 132a, . . . , 132n, via the non-programming content proxy server 138, to serve non-programming content to the client devices 132a, . . . , 132n.

The non-programming content proxy server 138 may comprise suitable logic, circuitry, and interfaces that may be configured to execute code to communicate with the client devices 132a, . . . , 132n and the Ad decisioning server 136. In accordance with an embodiment, the non-programming content proxy server 138 may receive requests from the client devices 132a, . . . , 132n when the client devices 132a, . . . , 132n generate requests for the Ad decisioning server. As described above, the requests may be encountered when the client devices 132a, . . . , 132n encounter various programming content indicators, non-programming content indicators, or overlay indicators. In such cases, the non-programming content proxy server 138 may generate requests to Ad decisioning server 136 for the advertisements on behalf of the client devices 132a, . . . , 132n. In another embodiment, the non-programming content proxy server 138 may receive the manifest form the content delivery system 130 and may deliver the manifest to the client devices 132a, . . . , 132n based on one or more client requests. The non-programming content proxy server 138 may be configured to detect for example break indicators, and call the Ad decisioning server 106a, replace the filler media segments in the manifest and then deliver the modified manifest to the client devices 132a, . . . , 132n. In an embodiment, the non-programming content proxy server 138 may be used for one or more client devices of the plurality of client devices 132a, . . . , 132n where the media player is fully controlled by a third party and does not support ad insertion. In such embodiment, ad blocking may be reduced which usually targets communication between the plurality of client devices 132a, . . . , 132n and the Ad decisioning server 106a. Further, the non-programming content proxy server 138 may replace the placeholder segments, such as slate content segments, with the advertisement content segments.

The plurality of first workers 140a, . . . , 140n in the publishing engine workers pool 122B may correspond to a plurality of instances of a processor which may be built with knowledge of how to execute each instruction type of a plurality of first instructions. In an embodiment, the plurality of first instructions may correspond to instructions for ingestion of live input streams and pre-encoded media assets and corresponding manifests. The plurality of first workers 140a, . . . , 140n may be configured to utilize the data carried within the plurality of first instructions. Each first worker in the plurality of first workers 140a, . . . , 140n may then exist and operate in an isolated context. In various embodiments, a count of the plurality of first workers 140a, . . . , 140n may be scale-up according to the number of first instructions queued in the publishing engine instruction queue 122A. Such scale-up may optimize infrastructure and operational cost associated with the ingestion of live input streams and pre-encoded media assets and corresponding manifests.

The plurality of second workers 142a, . . . , 142n in the publishing engine workers pool 122B may correspond to a plurality of instances of a processor which may be built with knowledge of how to execute each instruction type of a plurality of second instructions. In an embodiment, the plurality of second instructions may correspond to instructions for publishing disparate live media output streams. The plurality of second workers 142a, . . . , 142n may be configured to utilize the data carried within the plurality of second instructions. Each second worker in the plurality of second workers 142a, . . . , 142n may then exist and operate in an isolated context. In various embodiments, a count of the plurality of second workers 142a, . . . , 142n may scale-up according to increased number of second instructions queued in the publishing engine instruction queue 122A. Such scale-up may optimize infrastructure and operational cost associated with the publishing disparate live media output streams. In other embodiments, the count of the plurality of second workers 142a, . . . , 142n may scale-down according to reduced number of second instructions queued in the publishing engine instruction queue 122A. Such scale-down may again optimize infrastructure and operational cost associated with the publishing disparate live media output streams.

The plurality of third workers 144a, . . . , 144n in the publishing engine workers pool 122B may correspond to plurality of instances of a processor which may be built with knowledge of how to execute each instruction type of a plurality of third instructions. In an embodiment, the plurality of third instructions may correspond to instructions for monitoring disparate live media output streams. The plurality of third workers 144a, . . . , 144n may be configured to utilize the data carried within the plurality of third instructions. Each third worker in the plurality of third workers 144a, . . . , 144n may then exist and operate in an isolated context. In various embodiments, a count of the plurality of third workers 144a, . . . , 144n may be scale-up according to the number of third instructions queued in the publishing engine instruction queue 122A. Such scale-up may optimize infrastructure and operational cost associated with the monitoring of disparate live media output streams and scaling up or down the plurality of first workers 140a, . . . , 140n and the plurality of second workers 142a, . . . , 142n, so that the media packaging and distribution system 102 operates at maximum efficiency level.

The external monitoring system 146 may comprise suitable logic, circuitry, and interfaces that may be configured to execute code to monitor a media asset, for example HTTP Live Streaming (HLS) segments of the pre-encoded media assets as well as their respective manifests, stored in the media content storage system 126, and live input stream segments and manifests, stored in the live content storage system 124. The external monitoring system 146 may provide an input to the scheduler system 112 whether the pre-encoded media assets are already validated and ingested in the manifest metadata storage system 128 or not. Based on the input received from the external monitoring system 146, the scheduler system 112 may generate the plurality of initial instructions.

The network scheduler 148 may comprise suitable logic, circuitry, and interfaces that may be configured to execute a code that creates and handles a programming schedule of pre-encoded or on-demand media assets for a channel. The programming schedule of the pre-encoded or on-demand media assets for the channel defines which pre-encoded or on-demand media assets should be scheduled, time and duration at which the pre-encoded or on-demand media assets should be played in the generated disparate live media output streams, the ordering of the pre-encoded or on-demand media assets during playout, and when to distribute the media content to the client devices 132a, . . . , 132n over the web application, service or page. The network scheduler 148 may create the programming schedule based on a desired theme, content metadata, content rights, content eligibility, and content availability of the pre-encoded or on-demand media assets. The network scheduler 148 may also provide the capability to format non-programming break, such as ad break, durations and locations, as well as graphic overlay locations on the pre-encoded or on-demand media assets displayed on the client devices 132a, . . . , 132n. The media content that is distributed may include both the programming content, such as long-form presentations, short-form presentations, news or sporting events, and non-programming content, such as paid advertisements, public service advertisements, or promotional material.

The stream selection service 150 may be an interface between the scheduler system 112 of the media packaging and distribution system 102 and the plurality of client devices 132a, . . . , 132n. The stream selection service 150 may communicate a notification of a recommended media item to a consumer device, for example, the client device 132a. The notification may be communicated to seek a confirmation from a user, such as the user 134a associated with the client device 132a, to display the recommended disparate live media output stream at the client device 132a. The stream selection service 150 may further receive user-preferences from the plurality of client devices 132a, . . . , 132n. Thus, the stream selection service 150 may provide the client devices 132a, . . . , 132n requesting to view respective disparate live media output stream with the correct stream variant(s) based on the geolocation and identification of the users, along with the programming schedules, content rights, and user preferences information.

The switch logic manager 152 may comprise suitable logic, circuitry, and interfaces that may be configured to execute a code that creates and handles a programming schedule of live input streams for a channel. The programming schedule defines which live input streams should be scheduled, time and duration at which the live input streams should be played in the generated disparate live media output streams, the ordering of the live input streams during playout, and when to distribute the media content to the consumer devices 110a, . . . , 110n over the web application, service or page. The switch logic manager 152 may create the programming schedule based on schedules, rights, and preferences databases along with stream/owner operator requirements. The switch logic manager 152 may also determine required number of disparate live media output streams.

Apart from the above, the exemplary media packaging and distribution system 102 may further comprise various services, systems, and databases. Such services, systems, and databases may be utilized by the exemplary media packaging and distribution system 102 to generate disparate live media stream manifests. Examples of such services, systems, and databases ay include a program guide service, a stream selection service, stream operator preferences, an experience control system, content rights storage, a user preferences repository, a schedules, rights and preferences database and the like.

In accordance with an exemplary embodiment, the program guide service may provide a time accurate listing of which programming content is currently playing on each of the generated channels and broadcast channels as well as if experiences, like program restart, are available for a program. The stream operator preferences may provide content parameters, for example, regarding the types of channels to be generated (theme, genre, title, and the like), the number of advertisement breaks per hour, duration of such advertisement breaks, whether to insert advertisements between episodes, is a network logo required to be displayed and if so, then how often. The experience control system may implement a system that is based on content rights to allow individual clients to access the underlying pre-encoded content to enable services, such as restating a program from the beginning or moving forward in the programming schedule to a different programming content. The content rights storage may store a set of rules governing when and how media content may be used. For example, when the media content may be made available On-Demand, if the media content may be made available over the Internet, whether the media content may be used in a disparate live media output stream and the timeframe, or is the user allowed to restart the media content when live streamed. The user preferences repository may include index of previous content selections of the plurality of consumer devices $110a, \ldots, 110n$ for both live and pre-encoded programming that may be used to personalize and organize the user experience going forward.

In operation, the scheduler system 112 may be configured to generate a schedule of a plurality of initial instructions, based on information received from other devices, such as the external monitoring system 146, the network scheduler 148, the stream selection service 150, and/or the switch logic manager 152. The plurality of initial instructions may pertain to various operations, for example, but not limited to, ingestion, publishing, and monitoring. The scheduler system 112 may be further configured to detect the availability of the pre-encoded media assets and/or live input streams (and the input manifests) within the manifest metadata storage system 128, based on the schedule of the plurality of initial instructions. The scheduler system 112 may be further configured to issue a plurality of first instructions from the plurality of initial instructions to the publishing engine instruction queue 122A. The issuance of the plurality of first instructions from the publishing engine instruction queue 122A may be based on the availability of the plurality of pre-encoded media assets and/or the plurality of live input streams, and also the input manifests.

The stream publishing engine 114 may be configured to allocate each of the plurality of first instructions to a corresponding first worker of the plurality of first workers 140a, . . . , 140n based on the instruction type and the priority level of each of the plurality of first instructions. Each of the plurality of first workers 140a, . . . , 140n may be configured to read manifest data, which is non-ingested metadata, of the input manifests of the plurality of pre-encoded media assets and/or plurality of live input streams.

The publishing engine workers pool 122B may be configured to update a state of each of the plurality of first workers 140a, . . . , 140n from available state to a busy state. Once the state of a first worker of the plurality of first workers 140a, . . . , 140n is updated to the busy state, the first worker may not be allocated with the next first instruction until the state is updated back to available state.

The plurality of first workers 140a, . . . , 140n, allocated with the plurality of first instructions, may be configured to read the first manifest data and/or the second manifest data from the input manifest location specified in corresponding plurality of first instructions. The first manifest data and/or the second manifest data may be associated with the plurality of live input streams and/or the pre-encoded media assets, respectively. Further, the plurality of first workers 140a, . . . , 140n, allocated with the plurality of first instructions, may be configured to read the second manifest data associated with the plurality of live input streams from the input manifest location specified in corresponding first instructions. However, as the live media stream manifests are constantly being updated with new information, only second manifest data that has not currently been ingested may be read from the input manifest.

In accordance with an embodiment, the plurality of first workers 140a, . . . , 140n may be configured to validate and parse the first and the second manifest data to determine the first manifest metadata and the second manifest metadata that meet requirements necessary to be used in future instructions. The plurality of first workers 140a, . . . , 140n may be further configured to add distribution rights, preferences, and encoding metadata included in the plurality of first instructions to the first and the second manifest metadata.

The plurality of first workers 140a, . . . , 140n may be configured to store the determined first manifest metadata of the plurality of live input streams and the second manifest metadata of the plurality of pre-encoded media assets (with corresponding indices) in the manifest metadata storage system 128. In accordance with an embodiment, the plurality of first workers 140a, . . . , 140n may be configured to set expiration date/time on a record representing one or both of the first manifest metadata and the second manifest metadata.

The publishing engine workers pool 122B may deallocate the plurality of first workers 140a, . . . , 140n from corresponding plurality of first instructions, upon successful acknowledgement of completion by the plurality of first workers communicated to the publishing engine instruction queue 122A. The publishing engine workers pool 122B may be further configured to update a state of each of the plurality of first workers 140a, . . . , 140n from the busy state to the available state. Once the state of the first worker of the plurality of first workers 140a, . . . , 140n is updated to available state, the first worker may be allocated with the next first instruction available in the publishing engine instruction queue 122A.

Once ingested, the first and the second manifest metadata may be ready to be used for other tasks, such as to generate a plurality of disparate live media output stream manifests by the plurality of second workers 142a, . . . , 142n in the publishing engine workers pool 122B. The scheduler system 112 may be configured to present the representation of the plurality of pre-encoded media assets and/or live input streams and corresponding time information to the user, for example, the user 134a. The representation of the plurality of pre-encoded media assets and/or live input streams may be presented based on a programming schedule defined by the scheduler system 112, in conjunction with the network scheduler 148, the stream selection service 150, and the switch logic manager 152, for example.

The scheduler system 112 may be configured to issue the plurality of second instructions to the publishing engine instruction queue 122A based on the selection of the plurality of pre-encoded media assets from the plurality of pre-encoded media assets and/or selection of plurality of live input streams from the plurality of live input streams, by the user, such as the user 134a. A second instruction from the plurality of second instructions may comprise at least a state-of-published data that includes information related to a disparate live media output stream manifest and information associated with the ingested first manifest metadata.

The stream publishing engine 114 may be configured to allocate each of the plurality of second instructions to a corresponding second worker of the plurality of second workers 142a, ..., 142n based on the instruction type and the priority level of each of the plurality of second instructions. The publishing engine workers pool 122B may be configured to update a state of each of the plurality of second workers 142a, ..., 142n from available state to busy state.

The plurality of second workers 142a, ..., 142n may be configured to retrieve the next manifest segment metadata from the first manifest metadata and/or the second manifest metadata from the manifest metadata storage system 128. The plurality of second workers 142a, ..., 142n may be further configured to insert the retrieved next manifest segment metadata from the first manifest metadata and/or the second manifest metadata in the disparate live media output stream manifest. Accordingly, the state-of-published data of each of the plurality of second instructions may be updated. Finally, the plurality of second workers 142a, ..., 142n may be configured to publish the disparate live media output stream manifest as a live output stream manifest in the live content storage system 124. The plurality of second workers 142a, ..., 142n may be configured to generate a new second instruction that may have the same data as the original second instruction, but with the updated state-of-published data when the input manifest is live input streams manifest that is constantly updated based on new media segments.

The publishing engine workers pool 122B may deallocate the plurality of second workers 142a, ..., 142n from corresponding plurality of second instructions, upon successful acknowledgement of completion by the plurality of second workers communicated to the publishing engine instruction queue 122A. The publishing engine workers pool 122B may be configured to update a state of each of the plurality of second workers 142a, ..., 142n from busy state to available state.

Once the disparate live media output stream manifest is generated and published, the media player in the client device, for example the client device 132a, may read information from the published disparate live media output stream manifests and thus, generate disparate live media output streams for each of a plurality of channels to be viewed on the plurality of client devices 132a, ..., 132n. However, for monitoring of the overall performance of the media packaging and distribution system 102 in the ingesting and publishing processes, the plurality of third workers 144a, ..., 144n in the publishing engine workers pool 122B may execute the plurality of third instructions.

The scheduler system 112 may be configured to issue the plurality of third instructions to the publishing engine instruction queue 122A. The stream publishing engine 114 may be configured to allocate each of the plurality of third instructions to a corresponding third worker of the plurality of third workers 144a, ..., 144n. The plurality of third workers 144a, ..., 144n may be configured to monitor overall performance of the media packaging and distribution system 102 by oversighting over the generation and execution of other plurality of instructions, for example, the plurality of second and third instructions.

Figure 2A:
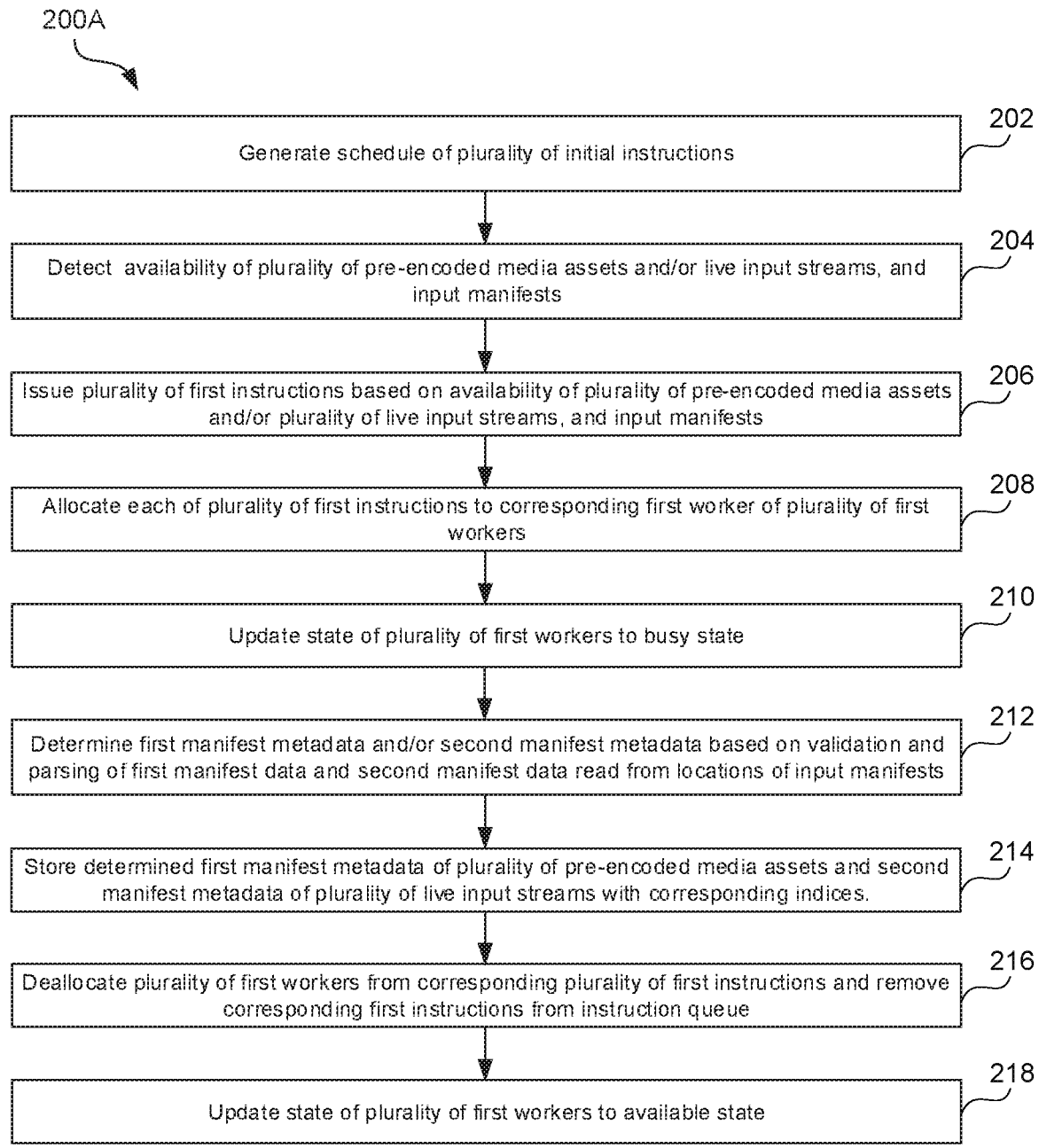
FIGS. 2A, 2B, and 2C collectively depict flowcharts illustrating exemplary operations for publishing a plurality of disparate live media output stream manifests using live input streams and pre-encoded media assets in the media packaging and distribution system of FIG. 1B, in accordance with an exemplary embodiment of the disclosure.
Figure 2B:
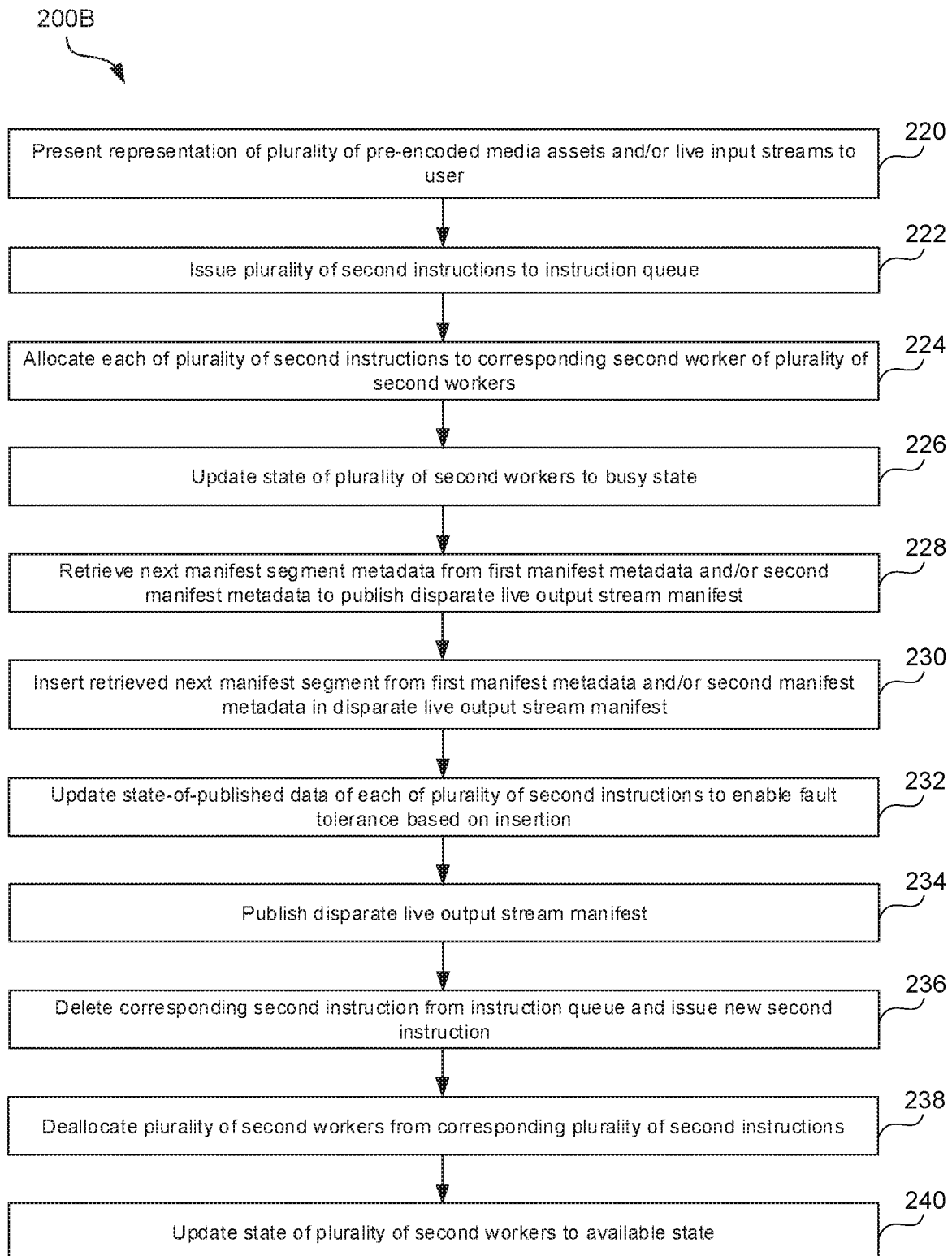
Figure 2C:
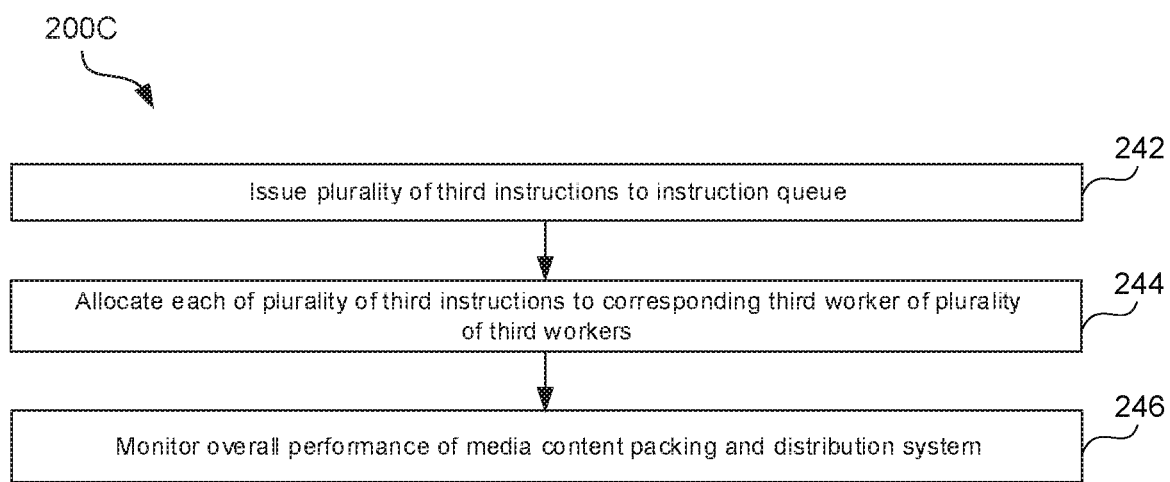

FIGS. 2A, 2B, and 2C collectively depict flowcharts illustrating exemplary operations for publishing a disparate live media output stream using pre-encoded media assets and/or live input streams in the television content packaging and distribution system of FIG. 1B, in accordance with an exemplary embodiment of the disclosure. Referring to FIGS. 2A, 2B, and 2C there are shown flowcharts 200A, 200B, and 200C comprising exemplary operations 202 through 218 in flowchart 200A, exemplary operations 220 to 240 in flowchart 200B, and 242 to 246 in flowchart 200C.

At 202, a schedule of a plurality of initial instructions may be generated. In accordance with an embodiment, the scheduler system 112 may be configured to generate the schedule of the plurality of initial instructions, based on information received from other devices, such as the external monitoring system 146, the network scheduler 148, the stream selection service 150, and/or the switch logic manager 152. The plurality of initial instructions may pertain to various operations, for example, ingestion of a pre-encoded media asset or a live input stream asset to make the asset ready to be inserted into a disparate live media output stream manifest. The plurality of initial instructions may further pertain to a programming schedule utilized for publishing the disparate live media output stream manifest that may be played out by a media player at the plurality of client devices 132a, ..., 132n at a specific time. The plurality of initial instructions may further pertain to monitoring overall performance of the media packaging and distribution system 102.

At 204, availability of the plurality of pre-encoded media assets and/or live input streams, and the input manifests may be detected. In accordance with an embodiment, the scheduler system 112 may be configured to detect the availability of the pre-encoded media assets and/or live input streams (and the input manifests) within the manifest metadata storage system 128, based on the schedule of the plurality of initial instructions.

In accordance with an embodiment, the input manifests may include one or more of the plurality of pre-encoded media asset manifests and/or the plurality of live input stream manifests. The plurality of pre-encoded media asset manifests remains unchanged over a period of time. However, the plurality of live input stream manifests are constantly updated based on addition of new media segments and/or a pre-encoded media asset manifest by the switch logic manager 152 and the stream publishing engine 114. The plurality of pre-encoded media asset manifests may be stored in the media content storage system 126 and the plurality of live input stream manifests may be stored in a live content storage system 124.

In accordance with various embodiments, the input manifest may correspond to a data set that may include playlists of the plurality of live input streams and pre-encoded media assets, program start/stop information about the plurality of live input streams, one or more overlay opportunities in the plurality of live input streams and pre-encoded media assets, duration of non-programming content breaks corresponding to insertion points within one live input stream and pre-encoded media asset or non-programming content breaks between the plurality of live input streams and pre-encoded media assets, and additional information. The additional information may signal a media discontinuity and content protection change within one live input stream and pre-encoded media asset or between the plurality of live input streams and pre-encoded media assets.

At 206, based on the availability of the plurality of pre-encoded media assets and/or the plurality of live input streams, and also the input manifests, a plurality of first instructions may be issued into the publishing engine instruction queue 122A. In accordance with an embodiment, the scheduler system 112 may be configured to issue the plurality of first instructions from the plurality of initial instructions to the publishing engine instruction queue 122A. The issuance of the plurality of first instructions from the publishing engine instruction queue 122A may be based on the availability of the plurality of pre-encoded media assets and/or the plurality of live input streams, and also the input manifests. In an embodiment, issuance of the plurality of first instructions from the publishing engine instruction queue 122A may be based on priority levels associated with each of the plurality of first instructions, date/time of completion of the plurality of first instructions, and instruction types (such as, ingestion instruction) of the plurality of first instructions.

Each first instruction of the plurality of first instructions may comprise at least an instruction type, a priority level, and a location of an input manifest. In accordance with various embodiments, the first instruction may further comprise locations of the plurality of pre-encoded media assets and live input streams, and playback rights associated with the plurality of pre-encoded media assets and live input streams required to be informed to the publishing engine workers pool 122B. The first instruction may further comprise information about encoding and digital rights management (DRM) metadata associated with the plurality of pre-encoded media assets and the live input streams, an expiration date for an ingested manifest metadata, date/time of the issuance of the plurality of first instructions, and date/time of completion of the plurality of first instructions.

In accordance with an embodiment, a new first instruction may be issued when the input manifest is a live input stream manifest. The scheduler system 112 may be configured to issue the new first instruction to the publishing engine instruction queue 122A when the input manifest is a live input stream manifest. The new first instruction may comprise the last ingested media segment, date/time of the last ingested media segment, and expiration date/time of currently ingested second manifest metadata. The new first instruction may further comprise information, similar to information included in corresponding previous first instruction from the plurality of first instructions.

At 208, each of the plurality of first instructions may be allocated to a corresponding first worker of the plurality of first workers 140a, . . . , 140n. In accordance with an embodiment, the stream publishing engine 114 may be configured to allocate each of the plurality of first instructions to a corresponding first worker of the plurality of first workers 140a, . . . , 140n based on the instruction type and the priority level of each of the plurality of first instructions. Each of the plurality of first workers 140a, . . . , 140n may be configured to read manifest data, which is non-ingested metadata, of the input manifests of the plurality of pre-encoded media assets and/or plurality of live input streams.

In this regard, the publishing engine instruction queue 122A may place the first instruction amongst other instructions in an order-matching rules governed by instruction execution priority, date/time the instruction should be completed by, and type of instruction (i.e., Ingestion instruction). As the first worker of the plurality of first workers 140a, . . . , 140n becomes available for further first instruction, the first worker may take ownership of the first instruction, i.e. the ingestion instruction, from the publishing engine instruction queue 122A. This may prevent a subsequent first worker from attempting to execute the same first instruction.

At 210, state of the plurality of first workers 140a, . . . , 140n may be updated to busy state. In accordance with an embodiment, the publishing engine workers pool 122B may be configured to update a state of each of the plurality of first workers 140a, . . . , 140n from available state to busy state. Once the state of a first worker of the plurality of first workers 140a, . . . , 140n is updated to busy state, the first worker may not be allocated with the next first instruction until the state is updated back to available state.

At 212, a first manifest metadata and/or a second manifest metadata may be determined based on validation and parsing of the first manifest data and/or the second manifest data read from the location of the input manifest. In accordance with an embodiment, the plurality of first workers 140a, . . . , 140n, allocated with the plurality of first instructions, may be configured to read the first manifest data and/or the second manifest data from the input manifest location specified in corresponding plurality of first instructions. The first manifest data and/or the second manifest data may be associated with the plurality of live input streams and/or the pre-encoded media assets, respectively. Further, the plurality of first workers 140a, . . . , 140n, allocated with the plurality of first instructions, may be configured to read the second manifest data associated with the plurality of live input streams from the input manifest location specified in corresponding first instructions. However, as the live media stream manifests are constantly being updated with new information, only second manifest data that has not currently been ingested may be read from the input manifest.

In accordance with an embodiment, the plurality of first workers 140a, . . . , 140n may be configured to validate and parse the first and the second manifest data to determine the first manifest metadata and the second manifest metadata that meet requirements necessary to be used in future instructions. The plurality of first workers 140a, . . . , 140n may be further configured to add distribution rights, preferences, and encoding metadata included in the plurality of first instructions to the first and the second manifest metadata.

At 214, the determined first manifest metadata of the plurality of live input streams and the second manifest metadata of the plurality of pre-encoded media assets may be stored with corresponding indices. In accordance with an embodiment, the plurality of first workers 140a, . . . , 140n may be configured to store the determined first manifest metadata of the plurality of live input streams and the second manifest metadata of the plurality of pre-encoded media assets (with corresponding indices) in the manifest metadata storage system 128. In accordance with an embodiment, the plurality of first workers 140a, . . . , 140n may be configured to set expiration date/time on a record representing one or both of the first manifest metadata and the second manifest metadata. The expiration date/time may be set when one or both of the first manifest metadata and the second manifest metadata with corresponding indices are stored in the manifest metadata storage system 128.

In accordance with an embodiment, the indexing and storage system 116 may be configured to ingest the first and the second manifest metadata associated with the plurality of the plurality of live input streams and the plurality of pre-encoded media assets, respectively. The indexing and storage system 116 may also perform indexing of the programming content, such as listed media segments of each of the plurality of pre-encoded media assets and the plurality of live input streams. The indexing and storage system 116 may further perform indexing of non-programming content, such as program boundaries and tag markings, advertisement break locations, overlay opportunities credits, digital rights management systems supported in the indexing and storage system. The indexing and storage system 116 may further perform indexing of programming content indicators, non-programming content indictors, and overlay indicators in the first and the second metadata manifest while the first and the second metadata manifest are ingested in the manifest metadata storage system 128.

In accordance with an embodiment, the plurality of first workers 140a, . . . , 140n may be further configured to issue a new first instruction to the publishing engine instruction queue 122A when the input manifest is a live input stream manifest. The new first instruction may comprise the last ingested media segment, date/time of the last ingested media segment, and expiration date/time of currently ingested one or both of the first manifest metadata and the second manifest metadata, in addition to similar information included in corresponding previous first instruction from the plurality of first instructions.

At 216, the plurality of first workers 140a, . . . , 140n may be deallocated from corresponding plurality of first instructions and the first instruction may be removed from the publishing engine instruction queue 122A. In accordance with an embodiment, the publishing engine workers pool 122B may deallocate the plurality of first workers 140a, . . . , 140n from corresponding plurality of first instructions, upon successful acknowledgement of completion by the plurality of first workers communicated to the publishing engine instruction queue 122A. In another embodiment, the publishing engine workers pool 122B may deallocate the plurality of first workers 140a, . . . , 140n from corresponding plurality of first instructions, when a specified amount of time expires. In this regard, ownership of the plurality of first instructions may be released only upon successful acknowledgement of completion by the first worker to the publishing engine instruction queue 122A or a given amount of time expires.

Accordingly, the publishing engine instruction queue 122A may be configured to remove the first instruction from the publishing engine instruction queue 122A once the execution of the first instruction is completed and corresponding first worker sends an acknowledgement of completion to the publishing engine instruction queue 122A.

At 218, state of the plurality of first workers 140a, . . . , 140n may be updated to available state. In accordance with an embodiment, the publishing engine workers pool 122B may be configured to update a state of each of the plurality of first workers 140a, . . . , 140n from busy state to available state. Once the state of the first worker of the plurality of first workers 140a, . . . , 140n is updated to available state, the first worker may be allocated with the next first instruction available in the publishing engine instruction queue 122A.

Thus, the plurality of first workers 140a, . . . , 140n in the publishing engine workers pool 122B may be configured to ingest the first manifest metadata and the second manifest metadata. Once ingested, the first and the second manifest metadata may be ready to be used for other tasks, such as to generate a plurality of disparate live media output stream manifests by the plurality of second workers 142a, . . . , 142n in the publishing engine workers pool 122B, as described in operations 220 to 240 herein.

At 220, a representation of the plurality of pre-encoded media assets and/or live input streams may be presented to a user, such as the user 134a. In accordance with an embodiment, the scheduler system 112 may be configured to present the representation of the plurality of pre-encoded media assets and/or plurality of live input streams and corresponding time information to the user, for example the user 134a. The representation of the plurality of pre-encoded media assets and/or plurality of live input streams may be presented based on a programming schedule defined by the scheduler system 112, in conjunction with the network scheduler 148, the stream selection service 150, and the switch logic manager 152, for example. Accordingly, the scheduler system 112 may issue a single instruction or multiple instructions, hereinafter a plurality of second instructions, for example, "Play VOD A at T1", "Play VOD B at T2".

At 222, the plurality of second instructions may be issued to instruction queue. In accordance with an embodiment, the scheduler system 112 may be configured to issue the plurality of second instructions to the publishing engine instruction queue 122A based on the selection of the plurality of pre-encoded media assets from the plurality of pre-encoded media assets and/or selection of plurality of live input streams from the plurality of live input streams, by the user, such as the user 134a. In this regard, the user, for example the user 134a, may provide a selection of one or more pre-encoded media assets from the presented plurality of pre-encoded media assets. Additionally, or alternatively, the user 134a, may provide a selection of one or more live input streams from the presented plurality of live input streams, based on which one or more second instructions from the plurality of second instructions are issued.

A second instruction from the plurality of second instructions may comprise at least a state-of-published data that includes information related to a disparate live media output stream manifest and information associated with the ingested first manifest metadata. The state-of-published data may indicate a reference to the ingested first manifest metadata and/or the second manifest metadata stored in the manifest metadata storage system 128, last published manifest segment, date/time of the last published manifest segment, designated disparate live media output stream manifests including bitrate variants, and the next manifest segment to be published. The state-of-published data may further indicate a reference to a manifest segment corresponding to another pre-encoded media asset to allow chaining of a plurality of pre-encoded media assets and/or plurality of live input streams. For example, after the last segment at the end of a first pre-encoded media asset and the next segment is from a second pre-encoded asset. In such case, a new second instruction may be created when the last segment of the first pre-encoded media asset is referenced, and thus, a chain of second instructions may be created.

The state-of-published data may further indicate information required to support, for example, insertion of programming content indicators, non-programming content indicators, overlay indicators, non-programming content, cue points event-based indicator, or segments of the non-programming content and corresponding durations, and identifiers of the non-programming content. Examples may include, but are not limited to, ad cue points, ad cue segments, ad cue duration, program start, program end, overlay triggers, chapter start, chapter end, ad identifiers, and the like. The state-of-published data may further indicate digital rights management (DRM) metadata, such as DRM license server identifier(s), DRM type(s) (may include FairPlay®, Widevine®, and/or PlayReady®), DRM-related rights limitations, or other such authentication requirements, such as personalized keys.

At 224, each of the plurality of second instructions may be allocated to a corresponding second worker of the plurality of second workers 142a, . . . , 142n. In accordance with an embodiment, the stream publishing engine 114 may be configured to allocate each of the plurality of second instructions to a corresponding second worker of the plurality of second workers 142a, . . . , 142n based on the instruction type and the priority level of each of the plurality of second instructions. As the second worker of the plurality of second workers 142a, . . . , 142n becomes available for further second instruction, the second worker my take ownership of the second instruction, i.e. the publish instruction, from the publishing engine instruction queue 122A. This may prevent a subsequent second worker from attempting to process the same second instruction.

At 226, state of the plurality of second workers 142a, . . . , 142n may be updated to the busy state. In accordance with an embodiment, the publishing engine workers pool 122B may be configured to update a state of each of the plurality of second workers 142a, . . . , 142n from available state to busy state. Once the state of a second worker of the plurality of second workers 142a, . . . , 142n is updated to busy state, the second worker may not be allocated with the next second instruction until the state is updated back to available state.

At 228, next manifest segment metadata from the first manifest metadata and/or second manifest metadata may be retrieved to publish a disparate live media output stream manifest. In accordance with an embodiment, the plurality of second workers 142a, . . . , 142n may be configured to retrieve the next manifest segment metadata from the first manifest metadata and/or the second manifest metadata from the manifest metadata storage system 128. The retrieval of the next manifest segment metadata may be based on the execution of the plurality of second instructions in accordance with the programming schedule.

At 230, retrieved next manifest segment metadata from the first manifest metadata and/or the second manifest metadata may be inserted in the disparate live media output stream manifest. In accordance with an embodiment, the plurality of second workers 142a, . . . , 142n may be configured to insert the retrieved next manifest segment metadata from the first manifest metadata and/or the second manifest metadata in the disparate live media output stream manifest. The manifest segment may correspond to media segments and one or more events, such as program start/end indicators, content or context change indicator, a break indicator, or an overlay indicator, from the plurality of pre-encoded media assets indicated in the first manifest metadata and/or the second manifest metadata. In accordance with an embodiment, appropriate data, for example, one or more features, within the disparate live media output stream manifest may be updated to facilitate the insertion of the first and/or the second manifest metadata.

At 232, a state-of-published data of each of the plurality of second instructions may be updated to enable fault tolerance based on the insertion. In accordance with an embodiment, the plurality of second workers 142a, . . . , 142n may be configured to update the state-of-published data of each of the plurality of second instructions. As the plurality of second instructions acts as a state, the state-of-published data may correspond to the current state of the generated disparate live media output stream manifest. For example, state-of-published data may be updated to include, for example, last manifest segment that was published, next manifest segment to be published, and date/time of the last publish date, and associated manifest metadata (for example sequence information).

At 234, the disparate live media output stream manifest may be published. In accordance with an embodiment, the plurality of second workers 142a, . . . , 142n may be configured to publish the disparate live media output stream manifest as a live output stream manifest in the live content storage system 124. The live content storage system 124 may further communicate the disparate live media output stream manifest to the content delivery system 130 to be read by the media player of the client device 132a, for example. Such disparate live media output stream manifest may correspond to an assembly of the first manifest metadata and the second manifest metadata.

The disparate live media output stream manifest may correspond to a data set that includes playlists of the plurality of live input streams and pre-encoded media assets, information about the plurality of live input streams, one or more overlay opportunities in the plurality of live input streams and pre-encoded media assets, duration of non-programming content breaks corresponding to insertion points within one live input stream and pre-encoded media asset or non-programming content breaks between the plurality of live input streams and pre-encoded media assets, and additional information that signals a media discontinuity and content protection change within one live input stream and pre-encoded media asset or between the plurality of live input streams and pre-encoded media assets.

At this time, the media player of the client device 132a may read the disparate live media output stream manifest published in the content delivery system 130 and playout the disparate live output stream based on pre-encoded media assets and live input streams referenced from the 126 and the live content storage system 124, respectively.

At 236, corresponding second instruction may be deleted from instruction queue and a new second instruction may be issued. In accordance with an embodiment, the corresponding second instruction may be deleted from publishing engine instruction queue 122A and the plurality of second workers 142a, . . . , 142n may be configured to issue the new second instruction to the publishing engine instruction queue 122A. In an embodiment, the new second instruction may have the same data as the original second instruction, but with the updated state-of-published data when the input manifest is live input streams manifest that is constantly updated based on new media segments. In another embodiment, the new second instruction may have the same data as the original second instruction, but with the updated state-of-published data when the input manifest is a pre-encoded media asset manifest.

At 238, the plurality of second workers 142a, . . . , 142n may be deallocated from corresponding plurality of second instructions. In accordance with an embodiment, the publishing engine workers pool 122B may deallocate the plurality of second workers 142a, . . . , 142n from corresponding plurality of second instructions, upon successful acknowledgement of completion by the plurality of second workers communicated to the publishing engine instruction queue 122A. In another embodiment, the publishing engine workers pool 122B may deallocate the plurality of second workers 142a, . . . , 142n from corresponding plurality of second instructions, when a specified amount of time expires. In this regard, ownership of the plurality of second instructions may be released only upon successful acknowledgement of completion by the second worker to the publishing engine instruction queue 122A or a given amount of time expires.

Accordingly, the publishing engine instruction queue 122A may be configured to remove the second instruction from the publishing engine instruction queue 122A once the execution of the second instruction is complete and corresponding second worker sends an acknowledgement of completion to the publishing engine instruction queue 122A.

At 240, state of the plurality of second workers 142a, ..., 142n may be updated to available state. In accordance with an embodiment, the publishing engine workers pool 122B may be configured to update a state of each of the plurality of second workers 142a, ..., 142n from busy state to available state. Once the state of a second worker of the plurality of second workers 142a, ..., 142n is updated to available state, the second worker may be allocated with the next second instruction available in the publishing engine instruction queue 122A.

Once generated, the plurality of second workers 142a, ..., 142n in the publishing engine workers pool 122B may publish the plurality of disparate live media output stream manifests in the content delivery system 130. Accordingly, the media player in the client device, for example the client device 132a, may read information from the published disparate live media output stream manifests and thus, generate disparate live media output streams for each of a plurality of channels to be viewed on the plurality of client devices 132a, ..., 132n. However, for monitoring of the overall performance of the media packaging and distribution system 102 in ingesting and publishing processes, the plurality of third workers 144a, ..., 144n in the publishing engine workers pool 122B may perform operations, as described in operations 242 to 246 herein.

At 242, a plurality of third instructions may be issued to the instruction queue. In accordance with an embodiment, the scheduler system 112 may be configured to issue the plurality of third instructions to the publishing engine instruction queue 122A.

At 244, each of the plurality of third instructions may be allocated to a corresponding third worker of the plurality of third workers 144a, ..., 144n. In accordance with an embodiment, the stream publishing engine 114 may be configured to allocate each of the plurality of third instructions to a corresponding third worker of the plurality of third workers 144a, ..., 144n.

At 246, overall performance of the media packaging and distribution system 102 may be monitored. In accordance with an embodiment, the plurality of third workers 144a, ..., 144n may be configured to monitor overall performance of the media packaging and distribution system 102 by oversighting over the generation and execution of other plurality of instructions, such as the plurality of first and the second instructions. For example, each third worker of the plurality of third workers 144a, ..., 144n may be configured to monitor the performance of the over timeliness of execution of the plurality of first and the second instructions and a count of workers required to maintain timely execution of the plurality of first and the second instructions. Each third worker may be further configured to report a current state of the execution of the plurality of first and the second instructions to an external monitoring system, remove obsolete manifest metadata from the manifest metadata storage system 128, and monitor a start or an end of publishing of the plurality of disparate live media output stream manifests.

Figure 3:
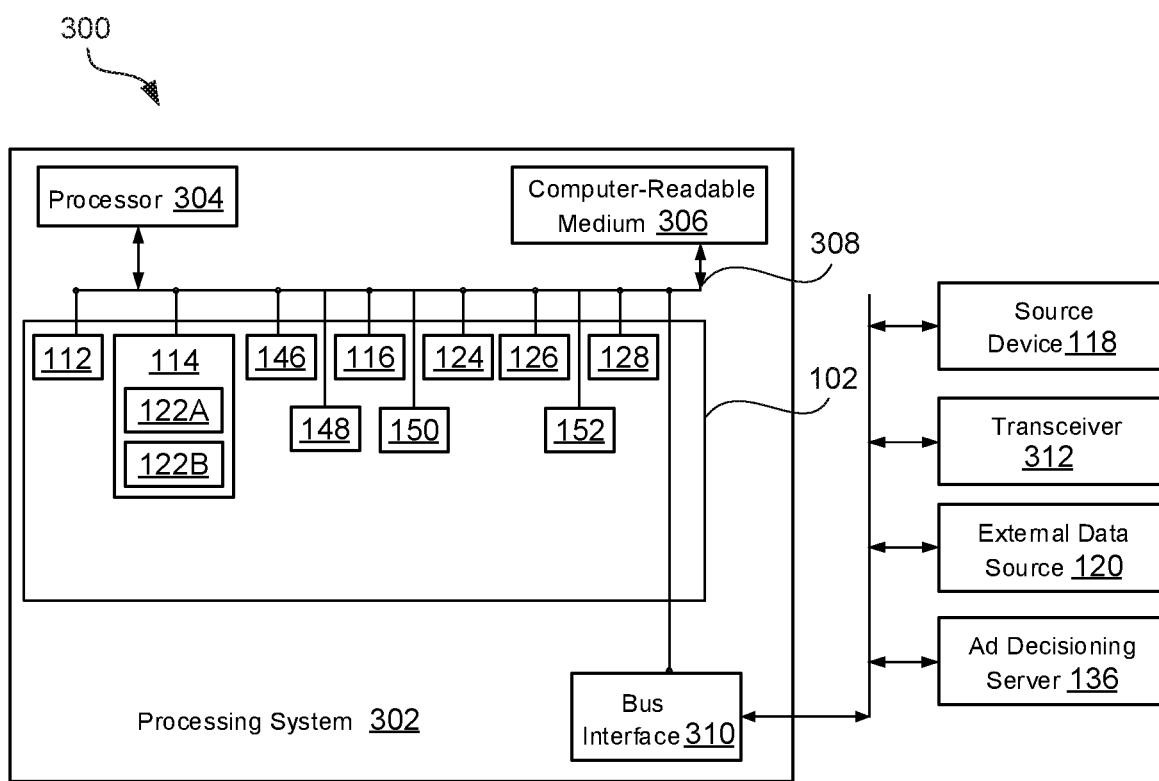
FIG. 3 is a conceptual diagram illustrating an example of a hardware implementation for a media packaging and distribution system employing a processing system for publishing a plurality of disparate live media output stream manifests using live input streams and pre-encoded media assets, in accordance with an exemplary embodiment of the disclosure.

FIG. 3 is a conceptual diagram illustrating an example of a hardware implementation for a content packaging and distribution system employing a processing system for publishing a disparate live media output stream using pre-encoded media assets, in accordance with an exemplary embodiment of the disclosure. Referring to FIG. 3, the hardware implementation shown by a representation 300 for the media packaging and distribution system 102 employs a processing system 302 for publishing a disparate live media output stream using pre-encoded media assets, in accordance with an exemplary embodiment of the disclosure, as described herein.

In some examples, the processing system 302 may comprise one or more hardware processor 304, a non-transitory computer-readable medium 306, a bus 308, a bus interface 310, and a transceiver 312. FIG. 3 further illustrates the scheduler system 112, the stream publishing engine 114, the indexing and storage system 116, the publishing engine instruction queue 122A, the publishing engine workers pool 122B, the live content storage system 124, the media content storage system 126, the manifest metadata storage system 128, the external monitoring system 146, the network scheduler 148, the stream selection service 150, and the switch logic manager 152, as described in detail in FIGS. 1A and 1B.

The hardware processor 304 may be configured to manage the bus 308 and general processing, including the execution of a set of instructions stored on the computer-readable medium 306. The set of instructions, when executed by the processor 304, causes the media packaging and distribution system 102 to execute the various functions described herein for any particular apparatus. The hardware processor 304 may be implemented, based on a number of processor technologies known in the art. Examples of the hardware processor 304 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 306 may be used for storing data that is manipulated by the hardware processor 304 when executing the set of instructions. The data is stored for short periods or in the presence of power. The computer-readable medium 306 may also be configured to store data for one or more of the scheduler system 112, the stream publishing engine 114, the indexing and storage system 116, the publishing engine instruction queue 122A, the publishing engine workers pool 122B, the live content storage system 124, the media content storage system 126, the manifest metadata storage system 128, the external monitoring system 146, the network scheduler 148, the stream selection service 150, and the switch logic manager 152.

The bus 308 is configured to link together various circuits. In this example, the media packaging and distribution system 102 employing the processing system 302 and the non-transitory computer-readable medium 306 may be implemented with bus architecture, represented generally by bus 308. The bus 308 may include any number of interconnecting buses and bridges depending on the specific implementation of the media packaging and distribution system 102 and the overall design constraints. The bus interface 310 may be configured to provide an interface between the bus 308 and other circuits, such as, the transceiver 312, and external devices, such as the source device 118, the external data source 120, the Ad decisioning server 136, and the client devices 132a, ..., 132n.

The transceiver 312 may be configured to provide a communication of the media packaging and distribution system 102 with various other apparatus, such as the Ad decisioning servers 106a, ..., 106n, the consumer devices 110a, ..., 110n, such as the client devices 132a, ..., 132n, the external data source 120, and the source device 118, via the network 108. The transceiver 312 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 3 may include software whose corresponding code may be executed by at least one processor, for across multiple processing environments. For example, scheduler system 112, the stream publishing engine 114, the indexing and storage system 116, the publishing engine instruction queue 122A, the publishing engine workers pool 122B, the live content storage system 124, the media content storage system 126, the manifest metadata storage system 128, the external monitoring system 146, the network scheduler 148, the stream selection service 150, and the switch logic manager 152 may include software that may be executed across a single or multiple processing environments.

In an aspect of the disclosure, the hardware processor 304, the computer-readable medium 306, or a combination of both may be configured or otherwise specially programmed to execute the operations or functionality of the scheduler system 112, the stream publishing engine 114, the indexing and storage system 116, the publishing engine instruction queue 122A, the publishing engine workers pool 122B, the live content storage system 124, the media content storage system 126, the manifest metadata storage system 128, the external monitoring system 146, the network scheduler 148, the stream selection service 150, and the switch logic manager 152, or various other components described herein, as described with respect to FIGS. 1A to 2C.

Various embodiments of the disclosure comprise the media content packaging and distribution system 102 that may be configured to publish a plurality of disparate live media output stream manifests to be viewed on a plurality of consumer devices (such as the consumer devices 110*a*, . . . , 110*n*). The media packaging and distribution system 102 may comprise, for example, the scheduler system 112, the stream publishing engine 114, the indexing and storage system 116, the publishing engine instruction queue 122A, the publishing engine workers pool 122B, the live content storage system 124, the media content storage system 126, the manifest metadata storage system 128, the external monitoring system 146, the network scheduler 148, the stream selection service 150, and the switch logic manager 152. The plurality of first workers from the publishing engine workers pool 122B may ingest manifest metadata into the manifest metadata storage system 128.

For the ingestion of the manifest metadata into the manifest metadata storage system 128, the scheduler system 112 may issue the plurality of first instructions into the publishing engine instruction queue 122A. Each first instruction of the plurality of first instructions comprises at least an instruction type, a priority level, and a location of an input manifest. The publishing engine workers pool 122B may allocate each of the plurality of first instructions to a corresponding first worker of the plurality of first workers 140*a*, . . . , 140*n* based on the instruction type and the priority level. Each of the plurality of first workers 140*a*, . . . , 140*n* reads first manifest data, which is non-ingested metadata, of a plurality of live input streams and/or a second manifest data of a plurality of pre-encoded media assets from locations of corresponding input manifests. The plurality of first workers 140*a*, . . . , 140*n* determines a first manifest metadata and a second manifest metadata based on validation and parsing of the first manifest data and second manifest data read from the locations of corresponding input manifest. The plurality of first workers 140*a*, . . . , 140*n* may store (or ingest) the determined first manifest metadata of the plurality of live input streams and a second manifest metadata of a plurality of pre-encoded media assets with corresponding indices in the manifest metadata storage system 128.

The scheduler system 112 may issue a plurality of second instructions to the publishing engine instruction queue 122A. A second instruction from the plurality of second instructions may comprise at least a state of published data that includes a disparate live output stream manifest and information associated with the ingested manifest metadata. The publishing engine workers pool 122B may allocate a second instruction from the plurality of second instructions to a second worker from the plurality of second workers 142*a*, . . . , 142*n*. The second worker may insert a next manifest segment to a disparate live output stream manifest upon reading the next manifest segment to be published for each bitrate variant from the ingested manifest metadata. The plurality of second workers 142*a*, . . . , 142*n* may generate the plurality of disparate live media output stream manifests for each of the plurality of channels to be viewed on the plurality of consumer devices 110*a*, . . . , 110*n* based on the disparate live output stream manifest.

In accordance with an embodiment, each of the input manifest and the disparate live output stream manifest may correspond to a data set that includes playlists of the plurality of live input streams and pre-encoded media assets, information about the plurality of live input streams, one or more overlay opportunities in the plurality of live input streams and pre-encoded media assets, duration of non-programming content breaks corresponding to insertion points within one live input stream and pre-encoded media asset or non-programming content breaks between the plurality of live input streams and pre-encoded media assets, and additional information that signals a media discontinuity and content protection change within one live input stream and pre-encoded media asset or between the plurality of live input streams and pre-encoded media assets.

In accordance with an embodiment, the scheduler system 112 may be configured to detect availability of the plurality of pre-encoded media assets and live input streams, to be ingested into manifest metadata storage system 128.

In accordance with an embodiment, each first instruction from the plurality of first instructions may further comprise locations of the plurality of pre-encoded media assets and live input streams, playback rights associated with the plurality of pre-encoded media assets and live input streams, encoding and digital rights management (DRM) metadata associated with the plurality of pre-encoded media assets and live input streams, an expiration date for an ingested manifest metadata, date/time of the issuance of the plurality of first instructions, and date/time of completion of the plurality of first instructions.

In accordance with an embodiment, the issuance of the plurality of first instructions from the publishing engine instruction queue 122A may be based on priority levels associated with each of the plurality of first instructions, date/time of completion of the plurality of first instructions, and instruction types of the plurality of first instructions.

In accordance with an embodiment, the input manifest is one of a pre-encoded media asset manifest or a live input stream manifest, wherein the pre-encoded media asset manifest remains unchanged, wherein the live input stream manifest is constantly updated based on addition of new media segments, wherein the pre-encoded media asset manifest is stored in the media content storage system 126 and the live input stream manifest is stored in a live content storage system 124.

In accordance with an embodiment, the plurality of first workers 140*a*, . . . , 140*n* may be further configured to incorporate distribution rights, user preferences, and encoding metadata, which are included in each of the plurality of first instructions, to one or both of the first manifest metadata and the second manifest metadata.

In accordance with an embodiment, the plurality of first workers 140*a*, . . . , 140*n* may be further configured to set expiration date/time on a record representing one or both of the first manifest metadata and the second manifest metadata in the manifest metadata storage system when one or both of the first manifest metadata and the second manifest metadata with corresponding indices is stored in the manifest metadata storage system 128.

In accordance with an embodiment, the plurality of first workers 140*a*, . . . , 140*n* may be further configured to issue a new first instruction to the publishing engine instruction queue 122A when the input manifest is a live input stream manifest. The new first instruction may comprise a last ingested media segment, date/time of the last ingested media segment, and expiration date/time of currently ingested one or both of the first manifest metadata and the second manifest metadata, in addition to similar information included in corresponding previous first instruction from the plurality of first instructions.

In accordance with an embodiment, for the publishing of the ingested manifest metadata, the plurality of first workers 140*a*, . . . , 140*n* may be configured to present a representation of the plurality of pre-encoded media assets and/or plurality of live input streams to a user based on the ingested first manifest metadata retrieved from the manifest metadata storage system 128.

In accordance with an embodiment, the one or more processors are further configured to scheduler system 112 may be configured to receive a selection of one or more pre-encoded media assets from the plurality of pre-encoded media assets and/or a selection of one or more live input streams from the plurality of live input streams, based on which one or more second instructions from the plurality of second instructions are issued.

In accordance with an embodiment, the state of published data may indicate a reference to the ingested manifest metadata stored in the manifest metadata storage system 128, last published manifest segment, date/time of the last published manifest segment, designated disparate live media output stream manifests including bitrate variants, the next manifest segment to be published, and may include a reference to a manifest segment corresponding to another pre-encoded media asset or live input streams to allow chaining of a plurality of pre-encoded media assets and/or plurality of live input streams. The state of published data may further indicate information required to support insertion of non-programming content, cue points event-based indicator, or segments of the non-programming content and corresponding durations, and identifiers of the non-programming content. The state of published data may further indicate digital rights management (DRM) metadata.

In accordance with an embodiment, the second worker may update data within the disparate live output stream manifest upon reading the next manifest segment from the ingested manifest metadata.

In accordance with an embodiment, the stream publishing engine 114 may be further configured to remove a second instruction from the publishing engine instruction queue 122A once an execution of the second instruction is complete and corresponding second worker sends an acknowledgement of completion to the publishing engine instruction queue 122A.

In accordance with an embodiment, the plurality of second workers 142*a*, . . . , 142*n* may be further configured to issue a new second instruction with an updated state of published data to the publishing engine instruction queue 122A when the input manifest is a live input stream manifest that is constantly updated based on addition of new media segments. Alternatively, or additionally, the plurality of second workers 142*a*, . . . , 142*n* may be further configured to issue a new second instruction with an updated state of published data to the publishing engine instruction queue 122A when the input manifest is a pre-encoded media asset manifest. The updated state of published data may include a published last manifest segment, the next manifest segment to be published, or date/time of the last publish date, and associated manifest metadata.

In accordance with an embodiment, the publishing engine workers pool 122B may be further configured to monitor performance over timeliness of execution of the plurality of first and the second instructions, monitor a count of workers required to maintain timely execution of the plurality of first and the second instructions, report a current state of the execution of the plurality of first and the second instructions to an external monitoring system, removal of obsolete manifest metadata from the manifest metadata storage system, and monitor a start or an end of publishing of the plurality of disparate live media output stream manifests.

In accordance with an embodiment, the publishing engine instruction queue 122A may be further configured to sort the plurality of first instructions and the plurality of second instructions based on corresponding execution requirements, mask one or more of the plurality of first instructions and the plurality of second instructions assigned to corresponding one or more first or second workers from other workers until completion or execution period time-out, remove the one or more of the plurality of first instructions, and the plurality of second instructions from the publishing engine instruction queue 122A upon completion or execution period time-out.

In accordance with an embodiment, the plurality of first workers 140*a*, . . . , 140*n* and the plurality of second workers 142*a*, . . . , 142*n* are autonomous and identical instances of a single processor operating in an isolated context, wherein each worker of the plurality of first workers 140*a*, . . . , 140*n* and the plurality of second workers 142*a*, . . . , 142*n* may be configured to create additional worker instances, destroy existing worker instances, execute a pre-defined publishing instruction one at a time, and create a pre-defined publishing instruction. Based on the plurality of first instructions for ingesting the manifest metadata into the manifest metadata storage system 128 and the plurality of second instructions for publishing the ingested manifest metadata, the publishing engine instruction queue 122A and the publishing engine workers pool 122B in the stream publishing engine 114 may be configured to provide fault tolerance during execution of the one or more first or second instructions.

In accordance with an embodiment, based on the plurality of first instructions for ingesting the manifest metadata into the manifest metadata storage system 128 and the plurality of second instructions for publishing the ingested manifest metadata, the publishing engine instruction queue 122A and the publishing engine workers pool 122B in the stream publishing engine 114 may be configured to optimize hardware resource consumption according to a demand required for a creation and maintenance of at least the plurality of disparate live media output stream manifests.

In accordance with an embodiment, the publishing engine workers pool 122B may be configured to deallocate the plurality of first workers 140a, . . . , 140n and the plurality of second workers 142a, . . . , 142n from corresponding plurality of first instructions and second instructions respectively, upon successful acknowledgement of completion by the plurality of first workers 140a, . . . , 140n and the plurality of second workers 142a, . . . , 142n to the publishing engine instruction queue 122A or when a specified amount of time expires.

Various embodiments of the disclosure comprise the media content packaging and distribution system 102 that may be configured to publish an ingested manifest metadata comprising a first manifest metadata and a second manifest metadata. The scheduler system 112 may issue a plurality of publish instructions to an instruction queue, wherein a second instruction from a plurality of publish instructions comprises at least a state of publish data that includes a disparate live output stream manifest and information associated with the ingested manifest metadata. The publishing engine workers pool 122B allocate a publish instruction from a plurality of publish instructions to a publishing worker from a plurality of publishing workers, wherein the publishing worker inserts a next manifest segment to the disparate live output stream manifest upon reading the next manifest segment to be published for each bitrate variant from the ingested manifest metadata. The plurality of first workers 140a, . . . , 140n generate a plurality of disparate live media output stream manifests for each of a plurality of channels to be viewed on a plurality of consumer devices based on the disparate live output stream manifest.

Various embodiments of the disclosure may provide a non-transitory computer-readable medium having stored thereon, computer implemented instruction that when executed by a processor causes the media packaging and distribution system 102 to execute operations to publish a plurality of disparate live media output stream manifests using live input streams and pre-encoded media assets to be viewed on a plurality of consumer devices (such as the consumer devices 110a, . . . , 110n). The media packaging and distribution system 102 may execute operations comprising ingesting manifest metadata into a manifest metadata storage system. For the ingestion of the manifest metadata into the manifest metadata storage system, the media packaging and distribution system 102 may execute operations comprising issuing a plurality of first instructions into an instruction queue, wherein each first instruction of the plurality of first instructions comprises at least an instruction type, a priority level, and a location of an input manifest. The media packaging and distribution system 102 may execute further operations comprising allocating each of the plurality of first instructions to a corresponding first worker of a plurality of first workers based on the instruction type and the priority level, wherein each of the plurality of first workers reads first manifest data, which is non-ingested metadata, of a plurality of live input streams and/or a second manifest data of a plurality of pre-encoded media assets from locations of corresponding input manifests. The media packaging and distribution system 102 may execute further operations comprising determining a first manifest metadata and a second manifest metadata based on validation and parsing of the first manifest data and second manifest data read from the locations of corresponding input manifest. The media packaging and distribution system 102 may execute further operations comprising storing the determined first manifest metadata of the plurality of live input streams and a second manifest metadata of a plurality of pre-encoded media assets with corresponding indices in the manifest metadata storage system.

The media packaging and distribution system 102 may execute further operations comprising publishing the ingested manifest metadata comprising the first manifest metadata and the second manifest metadata. For the publishing of the ingested manifest metadata, the media packaging and distribution system 102 may execute further operations comprising issuing a plurality of second instructions to the instruction queue, wherein a second instruction from the plurality of second instructions comprises at least a state of published data that includes a disparate live output stream manifest and information associated with the ingested manifest metadata. The media packaging and distribution system 102 may execute further operations comprising allocating a second instruction from the plurality of second instructions to a second worker from a plurality of second workers, wherein the second worker inserts a next manifest segment to the disparate live output stream manifest upon reading the next manifest segment to be published for each bitrate variant from the ingested manifest metadata. The media packaging and distribution system 102 may execute further operations comprising generate the plurality of disparate live media output stream manifests for each of the plurality of channels to be viewed on the plurality of consumer devices based on the disparate live output stream manifest.

The scheduler system 112, the stream publishing engine 114, the indexing and storage system 116, the publishing engine instruction queue 122A, the publishing engine workers pool 122B, the live content storage system 124, the media content storage system 126, the manifest metadata storage system 128, the external monitoring system 146, the network scheduler 148, the stream selection service 150, and the switch logic manager 152, in conjunction with each other, provide significant productivity and efficiency improvements. The process of publishing disparate live media output stream manifests by the media packaging and distribution system 102 for numerous consumer devices has been simplified. The simplification owes to the fact that the generated disparate live media output streams are independent of a requirement to re-encode and re-package first pre-encoded media assets and live input streams for media distribution to the plurality of consumer devices in real time or near-real time. Thus, multiple disparate live media output streams may be created utilizing less memory than would otherwise be required resulting in much faster processing time (faster computation time without sacrificing accuracy). This enables a faster or real time generation and publishing of multiple disparate live media output streams. The ability to quickly generate disparate live media output streams may free up valuable processing resources such as memory and computing power.

Thus, the network provider now is now capable of not only providing live channel offerings in cost-effective manner but also provide enhanced viewer experience to increase their appeal in order to gain wider audience.

The media packaging and distribution system 102 leverages an understanding of how the modern web streaming protocols work and generates a plurality of disparate live media output stream manifests. The disparate live media output stream manifests are manipulated based on live input stream manifests from the live input streams produced for web distribution, along with using existing pre-encoded media (such as VOD) assets prepared for web distribution to generate disparate live media output streams.

The media packaging and distribution system 102 reduces each step in the process of generating, publishing, monitoring, and maintaining the disparate live media output streams of the live channels to isolated instructions. Each instruction may include the data necessary to carry out the step without any prior knowledge of the previously executed step. Such instructions may then be stored into the publishing engine instruction queue 122A, awaiting execution. The publishing engine workers pool 122B may then be built with knowledge of how to execute each instruction type, utilizing the data carried within the instruction. Each worker in the publishing engine workers pool 122B may then exist in an isolated context. Accordingly, the number of workers are allowed to scale up or down according to the number of instructions queued. Such a provision of scaling of the number of workers facilitates an optimized infrastructure and operational costs associated with the creation and maintenance of the disparate live media output streams. Such a provision of scaling of the number of workers further creates a level of fault tolerance, as instruction sets are not lost and may be continued to be processed and maintained by other workers in the publishing engine workers pool 122B. Consequently, the media packaging and distribution system 102 is enabled to weather programmatic and hardware failures, thus making the media packaging and distribution system 102 more robust and reliable.

Further, separating the process of generating, publishing, monitoring, and maintaining the disparate live media output streams of the live channels into instructions and multiple instances of processors (such as workers), allows the media packaging and distribution system 102 to implement inherent fault tolerance during instruction processing. Thus, if a processor instance fails, instruction data (such as state of the instruction) is not lost. Further, if an instruction is problematic, causing a succession of processing failures, monitoring by the plurality of third workers may alert other systems/users to take action. Upon restart (such as after a total system failure) of the media packaging and distribution system 102, the intact instructions may allow for the processor instance to continue the state of the instruction prior to the failure.

In accordance with an embodiment, based on the plurality of first instructions for ingesting the manifest metadata into the manifest metadata storage system, the plurality of second instructions for publishing the ingested manifest metadata, and the plurality of third instructions for monitoring the publishing engine workers pool 122B, the media packaging and distribution system 102 may be configured to optimize hardware resource consumption according to a demand required for a creation and maintenance of at least the plurality of disparate live media output stream manifests. As the number of queued first, second and third plurality of instructions grows, so can the number of processors required to execute them. Further, as the number of queued first, second and third plurality of instructions falls, a number of existing processors instances can be destroyed to more suitably match the current instruction load.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for publishing a disparate live media output stream using pre-encoded media assets.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual server or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
   one or more processors in a media content packaging and distribution system that publishes a plurality of disparate live media output stream manifests for a plurality of channels, wherein the plurality of channels are viewable on a plurality of consumer devices,
   the one or more processors are configured to:
      ingest manifest metadata into a manifest metadata storage system, wherein for the ingestion of the manifest metadata into the manifest metadata storage system, the one or more processors are further configured to:
         issue a plurality of first instructions into an instruction queue, wherein each first instruction of the plurality of first instructions comprises at least an instruction type, a priority level, and a location of an input manifest;
         allocate each of the plurality of first instructions to a corresponding first worker of a plurality of first workers based on the instruction type and the priority level,
         wherein each of the plurality of first workers reads first manifest data, which is non-ingested metadata, of at least one of a plurality of live input streams or a second manifest data of a plurality of pre-encoded media assets from locations of corresponding input manifests,
         wherein the locations of the input manifests are associated with the plurality of first instructions;
         determine a first manifest metadata and a second manifest metadata based on validation and parse of the first manifest data and the second manifest data,
         wherein the ingested manifest metadata comprises the first manifest metadata and the second manifest metadata,
         wherein the first manifest data and the second manifest data are read from the locations of the input manifests; and
         store the determined first manifest metadata of the plurality of live input streams and the second manifest metadata of the plurality of pre-encoded media assets with corresponding indices in the manifest metadata storage system; and
      publish the ingested manifest metadata comprising the first manifest metadata and the second manifest metadata, wherein for the publication of the ingested manifest metadata, the one or more processors are further configured to:
         issue a plurality of second instructions to the instruction queue, wherein a second instruction from the plurality of second instructions comprises at least a state of published data that includes a disparate live output stream manifest and information associated with the ingested manifest metadata;
         allocate the second instruction from the plurality of second instructions to a second worker from a plurality of second workers,
         wherein the second worker inserts a next manifest segment to the disparate live output stream manifest based the ingested manifest metadata; and
         generate the plurality of disparate live media output stream manifests for each of the plurality of channels based on the disparate live output stream manifest.

2. The system according to claim 1, wherein the input manifest or the disparate live output stream manifest corresponds to a data set that includes playlists of the plurality of live input streams and pre-encoded media assets, information about the plurality of live input streams, one or more overlay opportunities in the plurality of live input streams and pre-encoded media assets, duration of non-programming content breaks corresponding to insertion points within one live input stream and pre-encoded media asset or non-programming content breaks between the plurality of live input streams and pre-encoded media assets, and additional information that signals a media discontinuity and content protection change within one live input stream and pre-encoded media asset or between the plurality of live input streams and pre-encoded media assets.

3. The system according to claim 1, wherein the one or more processors are further configured to detect an availability of the plurality of pre-encoded media assets and live input streams, to be ingested into manifest metadata storage system.

4. The system according to claim 1, wherein each first instruction from the plurality of first instructions further comprises locations of the plurality of pre-encoded media assets and live input streams, playback rights associated with the plurality of pre-encoded media assets and live input streams, encoded and digital rights management (DRM) metadata associated with the plurality of pre-encoded media assets and live input streams, an expiration date for the ingested manifest metadata, date of the issuance of the plurality of first instructions or time of the issuance of the plurality of first instructions, and date/time of completion of the plurality of first instructions.

5. The system according to claim 1, wherein the issuance of the plurality of first instructions from the instruction queue is based on priority levels associated with each of the plurality of first instructions, date/time of completion of the plurality of first instructions, and instruction types of the plurality of first instructions.

6. The system according to claim 1, wherein the one or more processors are further configured to deallocate the plurality of first workers and the plurality of second workers from corresponding plurality of first instructions and second instructions respectively, upon successful acknowledgement of completion by the plurality of first workers and the plurality of second workers to the instructions queue or when a specified amount of time expires.

7. The system according to claim 1, wherein the input manifest is one of a pre-encoded media asset manifest or a live input stream manifest, wherein the pre-encoded media asset manifest remains unchanged, wherein the live input stream manifest is constantly updated based on addition of new media segments, and wherein the pre-encoded media asset manifest is stored in a media content storage system and the live input stream manifest is stored in a live content storage system.

8. The system according to claim 1, wherein the one or more processors are further configured to incorporate distribution rights, user preferences, and encode metadata, which are included in each of the plurality of first instructions, to one or both of the first manifest metadata and the second manifest metadata.

9. The system according to claim 1, wherein the one or more processors are further configured to set expiration date/time on a record that represents one or both of the first manifest metadata and the second manifest metadata in the manifest metadata storage system when one or both of the first manifest metadata and the second manifest metadata with corresponding indices is stored in the manifest metadata storage system.

10. The system according to claim 1, wherein the one or more processors are further configured to issue a new first instruction to the instruction queue when the input manifest is a live input stream manifest, wherein the new first instruction comprises a last ingested media segment, date/time of the last ingested media segment, and expiration date/time of currently ingested one or both of the first manifest metadata and the second manifest metadata, in addition to similar information included in corresponding previous first instruction from the plurality of first instructions.

11. The system according to claim 1, wherein, to publish the ingested manifest metadata, the one or more processors are further configured to present a representation of at least one of the plurality of pre-encoded media assets or the plurality of live input streams to a user based on the first manifest metadata retrieved from the manifest metadata storage system.

12. The system according to claim 1, wherein the one or more processors are further configured to:
receive a selection of one or more pre-encoded media assets from at least one of the plurality of pre-encoded media assets or a selection of one or more live input streams from the plurality of live input streams, based on one or more second instructions from the plurality of second instructions are issued.

13. The system according to claim 1, wherein the state of published data indicates a reference to the ingested manifest metadata stored in the manifest metadata storage system, last published manifest segment, date/time of the last published manifest segment, designated disparate live media output stream manifests that include bitrate variants, the next manifest segment to be published, and may include a reference to a manifest segment corresponding to another pre-encoded media asset or live input streams to allow chains of at least one of the plurality of pre-encoded media assets or the plurality of live input streams.

14. The system according to claim 1, wherein the state of published data further indicates information required to support insertion of non-programming content, cue points event-based indicator, or segments of the non-programming content and corresponding durations, and identifiers of the non-programming content.

15. The system according to claim 1, wherein the state of published data further indicates digital rights management (DRM) metadata.

16. The system according to claim 1, wherein the second worker updates data within the disparate live output stream manifest based on the next manifest segment from the ingested manifest metadata.

17. The system according to claim 1, wherein the one or more processors are further configured to remove a second instruction from the instruction queue once an execution of the second instruction is complete and corresponding second worker sends an acknowledgement of completion to the instructions queue.

18. The system according to claim 1, wherein the one or more processors are further configured to issue a new second instruction with an updated state of published data to the instruction queue when the input manifest is a live input stream manifest that is constantly updated based on addition of new media segments.

19. The system according to claim 1, wherein the one or more processors are further configured to issue a new second instruction with an updated state of published data to the instruction queue when the input manifest is a pre-encoded media asset manifest.

20. The system according to claim 19, wherein the updated state of published data includes a published last manifest segment, the next manifest segment to be published, or date/time of the last publication date, and associated manifest metadata.

21. The system according to claim 1, wherein the one or more processors are further configured to monitor performance over timeliness of execution of the plurality of first and the second instructions, monitor a count of workers required to maintain timely execution of the plurality of first and the second instructions, report a current state of the execution of the plurality of first and the second instructions to an external monitoring system, removal of obsolete manifest metadata from the manifest metadata storage system, and monitor a start or an end of publication of the plurality of disparate live media output stream manifests.

22. The system according to claim 1, wherein, in the instruction queue, the one or more processors are further configured to sort the plurality of first instructions and the plurality of second instructions based on corresponding execution requirements, mask one or more of the plurality of first instructions and the plurality of second instructions assigned to corresponding one or more first or second workers from other workers until completion or execution period time-out, remove the one or more of the plurality of first instructions, and the plurality of second instructions from the instruction queue upon completion or execution period time-out.

23. The system according to claim 1, wherein the plurality of first and second workers are autonomous and identical instances of a single processor that operate in an isolated context, wherein each worker of the plurality of first and second workers is configured to create at least one of additional worker instances, destroy existing worker instances, execute a pre-defined publishing instruction one at a time, or create a pre-defined publishing instruction.

24. The system according to claim 23, wherein, based on the plurality of first instructions and, the one or more processors are configured to provide fault tolerance during execution of one or more of the plurality of first instructions or the plurality of second instructions.

25. The system according to claim 1, wherein, based on the plurality of first instructions to ingest the manifest metadata into the manifest metadata storage system and the plurality of second instructions to publish the ingested manifest metadata, the one or more processors are configured to optimize hardware resource consumption according to a demand required for a creation and maintenance of at least the plurality of disparate live media output stream manifests.

26. A system, comprising:
one or more processors in a media content packaging and distribution system to publish an ingested manifest metadata comprising a first manifest metadata and a second manifest metadata, wherein the one or more processors are configured to:
issue a plurality of publish instructions to an instruction queue, wherein a second instruction from the plurality of publish instructions comprises at least a state of publication data that includes a disparate live output stream manifest and information associated with the ingested manifest metadata;
allocate a publish instruction from a plurality of publish instructions to a publishing worker from a plurality of publishing workers, wherein the publishing worker inserts a next manifest segment to the disparate live output stream manifest based on the ingested manifest metadata; and
generate a plurality of disparate live media output stream manifests for each of a plurality of channels based on the disparate live output stream manifest, wherein the plurality of channels are viewable on a plurality of consumer devices.

27. A method, comprising:
in a media content packaging and distribution system for publishing a plurality of disparate live media output stream manifests for a plurality of channels, wherein the plurality of channels are viewable on a plurality of consumer devices:
ingesting manifest metadata into a manifest metadata storage system, wherein for the ingestion of the manifest metadata into the manifest metadata storage system, the ingestion further comprising:
issuing a plurality of first instructions into an instruction queue, wherein each first instruction of the plurality of first instructions comprises at least an instruction type, a priority level, and a location of an input manifest;
allocating each of the plurality of first instructions to a corresponding first worker of a plurality of first workers based on the instruction type and the priority level, wherein each of the plurality of first workers reads first manifest data, which is non-ingested metadata, of at least one of a plurality of live input streams or a second manifest data of a plurality of pre-encoded media assets from locations of corresponding input manifests,
wherein the locations of the input manifests are associated with the plurality of first instructions;
determining a first manifest metadata and a second manifest metadata based on validation and parsing of the first manifest data and the second manifest data,
wherein the ingested manifest metadata comprises the first manifest metadata and the second manifest metadata,
wherein the first manifest data and the second manifest metadata are read from the locations of the input manifests; and
storing the determined first manifest metadata of the plurality of live input streams and the second manifest metadata of the plurality of pre-encoded media assets with corresponding indices in the manifest metadata storage system; and
publishing the ingested manifest metadata comprising the first manifest metadata and the second manifest metadata, wherein for the publishing of the ingested manifest metadata further comprising:
issuing a plurality of second instructions to the instruction queue, wherein a second instruction from the plurality, of second instructions comprises at least a state of published data that includes a disparate live output stream manifest and information associated with the ingested manifest metadata;
allocating the second instruction from the plurality of second instructions to a second worker from a plurality of second workers,
wherein the second worker inserts a next manifest segment to the disparate live output stream manifest upon reading the ingested manifest metadata; and
generating the plurality of disparate live media output stream manifests for each of the plurality of channels based on the disparate live output stream manifest.

28. The method according to claim 27, further comprising detecting an availability of the plurality of pre-encoded media assets and live input streams to be ingested in a media content storage system.

29. The method according to claim 27, further comprising deallocating the plurality of first workers from the plurality of first instructions and the plurality of second workers from the plurality of second instructions, upon successful acknowledgement of completion by the plurality of first workers and the plurality of second workers to the instructions queue or when a specified amount of time expires.

30. The method according to claim 27, further comprising incorporating distribution rights, user preferences, and encoding metadata, which are included in each of the plurality of first instructions, to one or both of the first manifest metadata and the second manifest metadata.

31. The method according to claim 27, further comprising setting expiration date/time on a record representing one or both of the first manifest metadata and the second manifest metadata in the manifest metadata storage system when one or both of the first manifest metadata and the second manifest metadata with corresponding indices is stored in the manifest metadata storage system.

32. The method according to claim 27, further comprising issuing a new first instruction to the instruction queue when the input manifest is a live input stream manifest, wherein the new first instruction comprises a last ingested media segment, date/time of the last ingestion of the media segment, and expiration date/time of currently ingested one or both of the first manifest metadata and the second manifest metadata, in addition to similar information included in corresponding previous first instruction from the plurality of first instructions.

33. The method according to claim 27, further comprising, for the publishing of the ingested manifest metadata, presenting a representation of at least one of the plurality of pre-encoded media assets or the plurality of live input streams to a user based on the first manifest metadata retrieved from the manifest metadata storage system.

34. The method according to claim 27, further comprising receiving a selection of one or more pre-encoded media assets from at least one of the plurality of pre-encoded media assets or a selection of one or more live input streams from the plurality of live input streams, based on one or more second instructions from the plurality of second instructions are issued.

35. The method according to claim 27, further comprising removing a second instruction from the instruction queue once an execution of the second instruction is complete and corresponding second worker sends an acknowledgement of completion to the instructions queue.

36. The method according to claim 27, further comprising issuing a new second instruction with an updated state of published data to the instruction queue when the input manifest is a live input stream manifest that is constantly updated based on addition of new media segments.

37. A method, comprising:
in a media content packaging and distribution system for publishing an ingested manifest metadata comprising a first manifest metadata and a second manifest metadata:
issuing a plurality of publish instructions to an instruction queue, wherein a second instruction from a plurality of publish instructions comprises at least a state of publish data that includes a disparate live output stream manifest and information associated with the ingested manifest metadata;
allocating a publish instruction from a plurality of publish instructions to a publishing worker from a plurality of publishing workers, wherein the publishing worker inserts a next manifest segment to the disparate live output stream manifest upon reading the next manifest segment to be published for each bitrate variant from the ingested manifest metadata; and
generating a plurality of disparate live media output stream manifests for each of a plurality of channels based on the disparate live output stream manifest, wherein the plurality of channels are viewable on a plurality of consumer devices.

38. A non-transitory computer-readable medium having stored thereon, computer implemented instruction that when executed by a processor in a computer, causes the computer to execute operations, the operations comprising:
in a media content packaging and distribution system for publishing a plurality of disparate live media output stream manifests for a plurality of channels, wherein the plurality of channels are viewable on a plurality of consumer devices:
ingesting manifest metadata into a manifest metadata storage system, wherein for the ingestion of the manifest metadata into the manifest metadata storage system, the ingestion further comprising:
issuing a plurality of first instructions into an instruction queue, wherein each first instruction of the plurality of first instructions comprises at least an instruction type, a priority level, and a location of an input manifest;
allocating each of the plurality of first instructions to a corresponding first worker of a plurality of first workers based on the instruction type and the priority level, wherein each of the plurality of first workers reads first manifest data, which is non-ingested metadata, of at least one of a plurality of live input streams or a second manifest data of a plurality of pre-encoded media assets from locations of corresponding input manifests,
wherein the locations of the input manifests are associated with the plurality of first instructions;
determining a first manifest metadata and a second manifest metadata based on validation and parsing of the first manifest data and the second manifest metadata,
wherein the ingested manifest metadata comprises the first manifest metadata and the second manifest metadata,
wherein the first manifest data and the second manifest data are read from the locations of the input manifests; and
storing the determined first manifest metadata of the plurality of live input streams and the second manifest metadata of the plurality of pre-encoded media assets with corresponding indices in the manifest metadata storage system; and
publishing the ingested manifest metadata comprising the first manifest metadata and the second manifest metadata, wherein for the publishing of the ingested manifest metadata further comprising:
issuing a plurality, of second instructions to the instruction queue, wherein a second instruction from the plurality of second instructions comprises at least a state of published data that includes a disparate live output stream manifest and information associated with the ingested manifest metadata;
allocating the second instruction from the plurality of second instructions to a second worker from a plurality of second workers, wherein the second worker inserts a next manifest segment to the disparate live output stream manifest upon the ingested manifest metadata; and generating the plurality of disparate live media output stream manifests for each of the plurality of channels based on the disparate live output stream manifest.

* * * * *